(12) United States Patent
Narita et al.

(10) Patent No.: US 11,939,011 B2
(45) Date of Patent: Mar. 26, 2024

(54) STAND-UP VEHICLE

(71) Applicant: TOYOTA JIDOSHA KABUSHIKI KAISHA, Toyota Aichi-ken (JP)

(72) Inventors: Saki Narita, Toyota Aichi-ken (JP); Tetsuya Kanata, Susono Shizuoka-ken (JP); Yozo Iwami, Susono Shizuoka-ken (JP); Daisaku Honda, Nagoya Aichi-ken (JP); Yuhei Katsumata, Fuji Shizuoka-ken (JP); Hideki Fukudome, Toyota Aichi-ken (JP); Takuya Watabe, Hachioji Tokyo-to (JP); Naoko Ichikawa, Shibuya-ku Tokyo-to (JP); Yuta Maniwa, Susono Shizuoka-ken (JP); Yuki Nishikawa, Susono Shizuoka-ken (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 407 days.

(21) Appl. No.: 17/470,563

(22) Filed: Sep. 9, 2021

(65) Prior Publication Data

US 2022/0081046 A1    Mar. 17, 2022

(30) Foreign Application Priority Data

Sep. 11, 2020    (JP) .................................. 2020-152964

(51) Int. Cl.
*B62D 51/02*    (2006.01)
*B60K 35/00*    (2006.01)
(Continued)

(52) U.S. Cl.
CPC .............. *B62D 51/02* (2013.01); *B60K 35/00* (2013.01); *B60N 3/02* (2013.01); *B60Q 9/00* (2013.01);
(Continued)

(58) Field of Classification Search
CPC ........................ B62D 51/02; B60W 2040/0872
See application file for complete search history.

(56) References Cited

U.S. PATENT DOCUMENTS

2019/0133511 A1\* 5/2019 Migneco .............. A61B 5/4064
2019/0248439 A1\* 8/2019 Wang .................... B62K 11/10
(Continued)

FOREIGN PATENT DOCUMENTS

| JP | 2001-017402 A | 1/2001 |
| JP | 2003-148967 A | 5/2003 |

(Continued)

*Primary Examiner* — Jeffrey J Restifo
(74) *Attorney, Agent, or Firm* — Dinsmore & Shohl LLP

(57) ABSTRACT

A stand-up vehicle includes a vehicle upper portion, a handrail, one or more biometric information sensors, and one or more processors. The vehicle upper portion has a riding surface on which a user stands. The handrail is provided at an upper portion of the vehicle and is gripped by a user. The one or more biometric information sensors are at least one of a sensor provided on a handrail and a weight sensor provided below a riding surface and having the riding surface as a weight detection surface, and detect biometric information of the user. The one or more processors perform notification processing for notifying a user of biometric information detected by the one or more biometric information sensors.

9 Claims, 15 Drawing Sheets

(51) Int. Cl.
*B60N 3/02* (2006.01)
*B60Q 9/00* (2006.01)
*B60W 40/08* (2012.01)
*G07C 5/08* (2006.01)
*G08B 5/22* (2006.01)
*G08B 21/02* (2006.01)

(52) U.S. Cl.
CPC ........... *B60W 40/08* (2013.01); *G07C 5/0866* (2013.01); *G08B 5/22* (2013.01); *G08B 21/0202* (2013.01); *B60K 35/28* (2024.01); *B60K 2360/16* (2024.01)

(56) References Cited

U.S. PATENT DOCUMENTS

| | | | | |
|---|---|---|---|---|
| 2019/0375427 | A1* | 12/2019 | Whitt | G01C 21/3492 |
| 2020/0170576 | A1* | 6/2020 | Lerner | B60K 28/06 |
| 2021/0132633 | A1* | 5/2021 | Hoshino | B62D 51/02 |
| 2021/0380180 | A1* | 12/2021 | Garcia Henarejos | B62K 19/30 |
| 2022/0063597 | A1* | 3/2022 | Narita | B60Q 3/745 |
| 2022/0063619 | A1* | 3/2022 | Maniwa | B60W 50/082 |
| 2022/0080965 | A1* | 3/2022 | Watabe | B60W 60/00136 |
| 2022/0081046 | A1* | 3/2022 | Narita | G07C 5/0866 |
| 2022/0105750 | A1* | 4/2022 | Ishii | B66F 9/06 |
| 2022/0111851 | A1* | 4/2022 | An | B60W 50/14 |
| 2022/0129227 | A1* | 4/2022 | Narita | G06F 3/1423 |
| 2022/0153302 | A1* | 5/2022 | Arechiga-Gonzalez | A61B 5/7264 |
| 2022/0211568 | A1* | 7/2022 | AlGhazi | A61B 5/1117 |

FOREIGN PATENT DOCUMENTS

| | | |
|---|---|---|
| JP | 2009-231577 A | 10/2009 |
| JP | 2012-232001 A | 11/2012 |
| JP | 2019-137250 A | 8/2019 |

* cited by examiner

STAND-UP VEHICLE

CROSS-REFERENCE TO RELATED APPLICATIONS

This application claims priority to Japanese Patent Application No. 2020-152964 filed on Sep. 11, 2020, the entire contents of which are herein incorporated by reference.

BACKGROUND

Technical Field

The present disclosure relates to a stand-up vehicle having a vehicle upper portion on which a user stands.

Background Art

JP 2001-017402 A discloses a handrail provided in a bathroom. The handrail incorporates a heart rate meter for measuring heart rate in a bathroom.

JP 2012-232001 A discloses a heart rate measurement device that measures the heart rate of a driver of a vehicle. This heartbeat measuring device uses a sensor that measures a potential difference signal between an electrode provided on a steering wheel and a reference electrode, and a sensor that measures a potential difference signal between an electrode provided on a seat and the reference electrode.

SUMMARY

In a standing-ride type vehicle having a vehicle upper portion on which a user rides while standing, if the user can acquire his/her own biometric information without taking special time and effort while riding, the convenience of the standing-ride type vehicle can be improved.

The present disclosure has been made in view of the above-described problem, and an object of the present disclosure is to provide a stand-up vehicle in which the user can acquire his/her own biometric information without taking special time and effort while riding.

A stand-up vehicle according to the present disclosure includes a vehicle upper portion, a handrail, one or more biometric information sensors, and one or more processors. The vehicle upper portion has a riding surface configured for the user to stand on. The handrail is provided at an upper portion of the vehicle and the handrail is configured to be gripped by the user. The one or more biometric information sensors are at least one of a sensor provided on the handrail and a weight sensor provided below the riding surface and having the riding surface as a weight detection surface, and which detect biometric information of the user. The one or more processors perform notification processing for notifying the user of biometric information detected by the one or more biometric information sensors.

The one or more biometric information sensors may include a pulse sensor on the handrail.

The one or more biometric information sensors may include a body temperature sensor provided on the handrail.

In the notification process, the one or more processors may transmit the biometric information detected by the one or more biometric information sensors to a mobile terminal of the user whose biometric information is to be detected.

The stand-up vehicle may further comprise a display for displaying the biometric information transmitted from the one or more processors in the notification process. The display may have a surface structure that is disposed to face the user who is a detection target of the biometric information and that limits a viewing angle of the display within a predetermined range.

The one or more processors may execute an abnormality determination processing for determining whether or not there is an abnormality in the biometric information detected by the one or more biometric information sensors. The one or more processors may execute a report processing of notifying the outside of the stand-up vehicle of a request for rescue of the user when it is determined that there is an abnormality in the abnormality determination process.

The one or more biometric information sensors may include a pulse sensor on the handrail. In the abnormality determination process, the one or more processors may determine whether a time increase rate of the pulse detected by the pulse sensor is higher than a first threshold. The one or more processors may execute the report processing when the time increase rate is higher than a first threshold.

The one or more biometric information sensors may include a weight sensor. In the abnormality determination process, the one or more processors may determine whether or not the weight detected by the weight sensor varies with a fluctuation range higher than a second threshold. The one or more processors may execute the report processing in a case where the weight detected by the weight sensor fluctuates in a fluctuation range greater than a second threshold value.

The stand-up vehicle may further comprise a recording device for recording at least one of a sound and an image of at least one of a riding space located on the riding surface and the surroundings of the stand-up vehicle. In addition, the one or more processors may execute a recording process of recording at least one of the sound and the image by operating the recording device in a case where it is determined that the weight detected by the weight sensor in the abnormality determination process varies with a variation width higher than the second threshold value.

The one or more biometric information sensors may include a body composition sensor having a pair of electrodes provided on the handrail, the body composition sensor detecting body composition information when the pair of electrodes are in contact with both hands of the user.

According to the stand-up vehicle of the present disclosure, the user can acquire his/her own biometric information during riding by using the biometric information sensor. The biometric information sensor is at least one of a sensor provided on the handrail and a weight sensor provided below the riding surface and having the riding surface as a weight detection surface. Therefore, the user can acquire his/her own biometric information without taking a special time and effort during boarding. In addition, in the case where the biometric information sensor is provided on the handrail, the user can acquire his or her own biometric information only by gripping the handrail to ensure safety during riding.

DETAILED DESCRIPTION

In each of the embodiments described below, elements common to each of the drawings are denoted by the same reference description thereof will be omitted or simplified. In addition, in the following embodiments, when the number, quantity, amount, range, or the like of each element is mentioned, the present disclosure is not limited to the mentioned number unless otherwise specified or unless clearly specified in principle.

1. First Embodiment 1-1. Configuration Example of Stand-Up Type Vehicle (Vehicle for Moving People)

Figure 1:
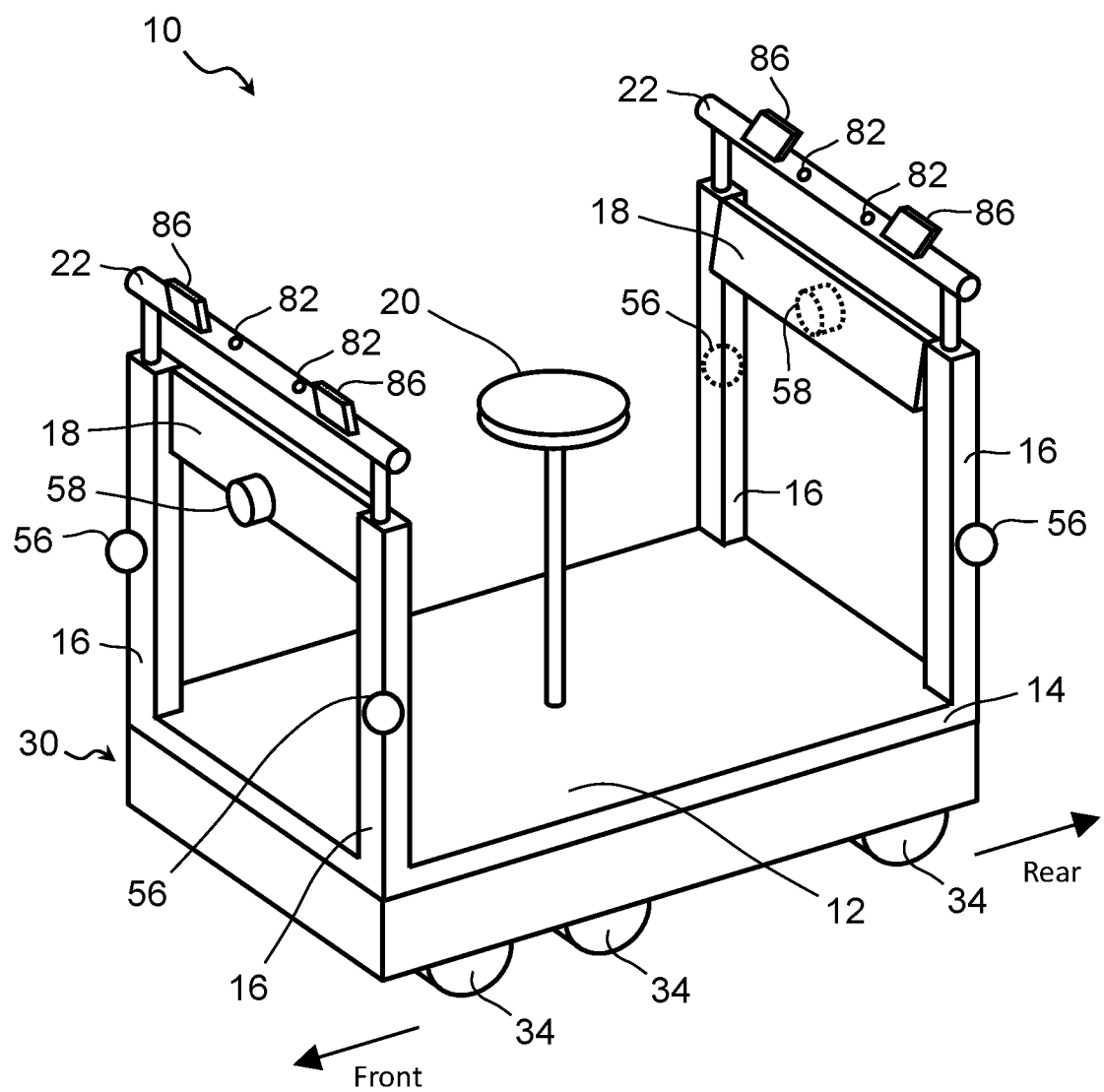
FIG. 1 is a perspective view of a stand-up vehicle according to a first embodiment.
Figure 2:
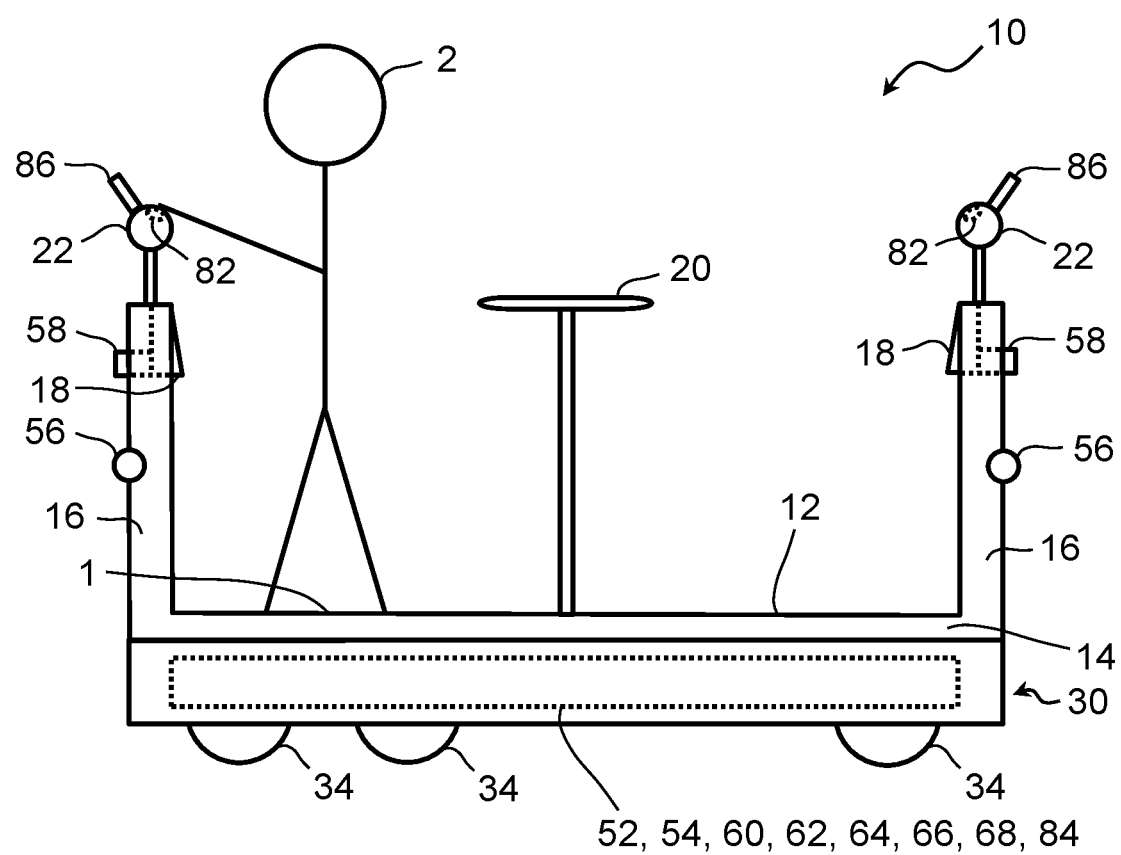
FIG. 2 is a side view of the stand-up vehicle shown in FIG. 1.
Figure 3:
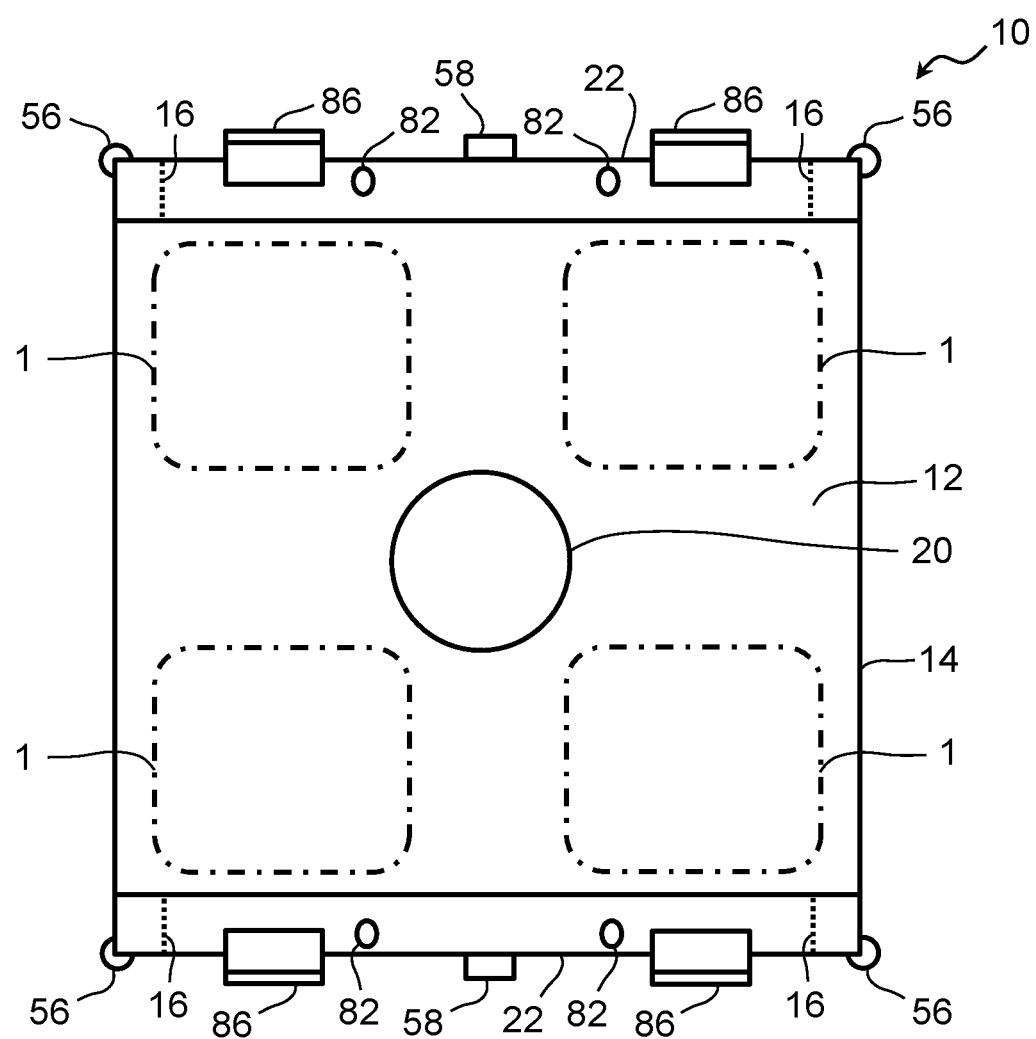
FIG. 3 is a plan view of the stand-up vehicle shown in FIG. 1.

FIG. 1 is a perspective view of a stand-up vehicle 10 according to a first embodiment. FIGS. 2 and 3 are a side view and a plan view, respectively, of the stand-up vehicle 10 shown in FIG. 1.

The stand-up vehicle 10 (hereinafter, simply referred to as a "vehicle 10") includes a top plate 14 having a riding surface (deck) 12 on which a user stands. The top plate 14 constitutes an upper portion of the vehicle 10, which corresponds to an example of the "vehicle upper portion" according to the present disclosure. The riding surface 12 is an upper surface of the top plate 14. The stand-up vehicle 10 is a type of autonomous traveling vehicle capable of unmanned driving. More specifically, the stand-up vehicle 10 carries people on the top plate 14. The riding capacity of such a vehicle 10 is not particularly limited, but the riding capacity of the vehicle 10 of the first embodiment is, for example, four persons as shown as an assumed riding position 1 in FIG. 3. That is, the vehicle 10 is a small stand-up vehicle (cart). The vehicle 10 may have a function of traveling by an operation of the user or a driver instead of a vehicle dedicated to autonomous traveling described below.

In the vehicle 10, the configuration of the riding space positioned on the riding surface 12 of the top plate 14 can be freely selected. FIGS. 1 to 3 illustrate an example of the configuration. A support 16 is provided at each of the four corners of the riding surface 12. Each support 16 stands upright from the riding surface 12. The support 16 may be formed integrally with the top plate 14 or may be formed separately from the top plate 14.

The vehicle 10 is provided with a backrest 18 at both its front and rear ends. The backrest 18 is formed so as to connect the tips of the two support 16 at each of the front end portion and the rear end portion of the vehicle 10. The user of the vehicle 10 can also stand while leaning against the backrest 18 during riding. A table 20, convenient for the user, is attached to the center of the riding surface 12.

The vehicle 10 is also provided with a handrail 22 at both its front and rear ends. These handrails 22 are provided to be grasped by the user such as the user 2 during riding. As an example, the handrail 22 is formed above the backrest 18 so as to bridge the tips of the two support 16 at each of the front end portion and the rear end portion. The detailed structure of the handrail 22 will be described in detail later with additional reference to FIG. 8.

Further, the vehicle 10 is provided with a chassis unit 30 relating to a traveling function together with the top plate 14. The top plate 14 is, for example, a separate body from the upper surface of the chassis unit 30, and is mounted on the chassis unit 30. Alternatively, the top plate 14 may constitute the upper surface of the chassis unit 30.

Figure 4:
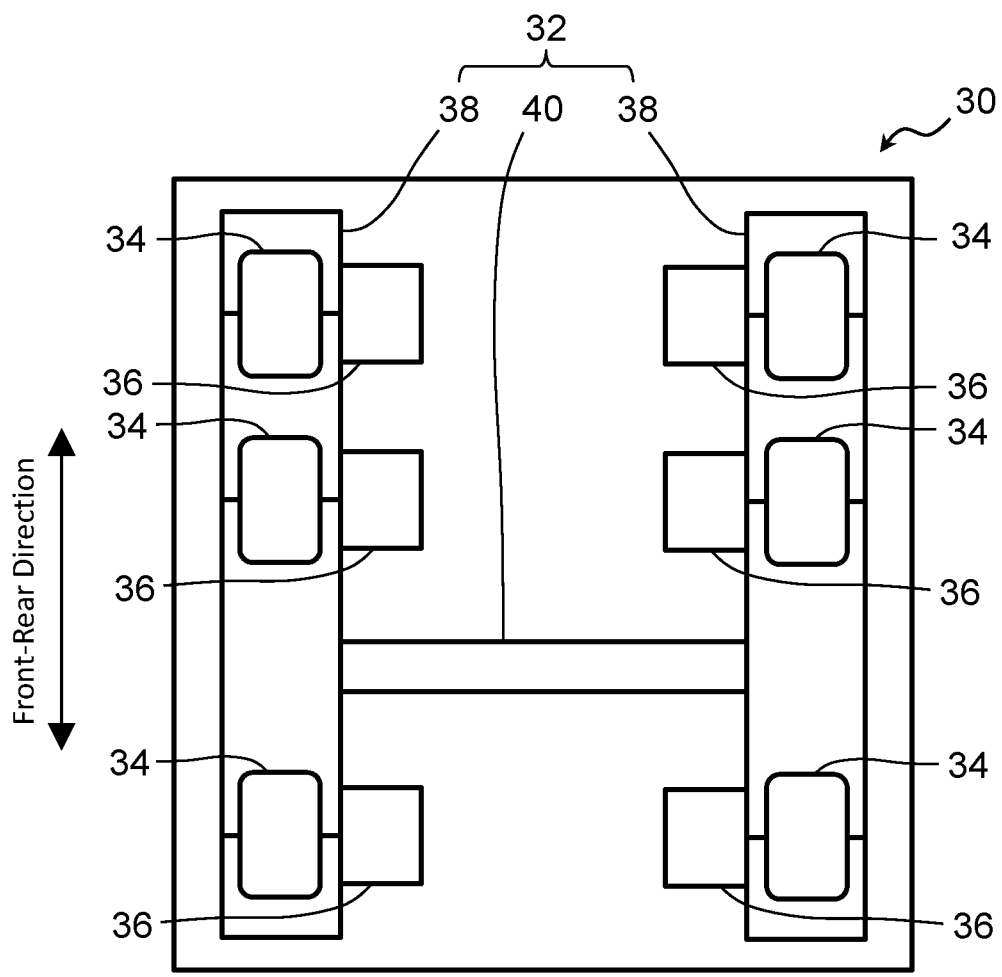
FIG. 4 is a bottom view showing an example configuration of a chassis unit of the stand-up vehicle shown in FIG. 1.

Additional reference is made to FIG. 4. FIG. 4 is an example of the chassis unit 30 illustrated in FIG. 1. The chassis unit 30 includes a frame 32, wheels 34, and an electric motor 36. As an example, six wheels 34 are provided. More specifically, three wheels 34 are disposed on each of the left and right sides of the vehicle 10 in a bilaterally symmetrical manner. The electric motor 36 is provided, for example, coaxially with each of the six wheels 34.

The number of the wheels 34 is arbitrarily determined in accordance with requirements such as the riding capacity of the vehicle 10 and the required driving force. Instead of six, for example, a total of four wheels, i.e., two wheels on the left and two wheels on the right, may be used. Further, the number of the electric motors 36 does not necessarily have to be the same as the number of the wheels 34, and may be changed according to requirements such as a required driving force. The electric motor 36 is an example of a power unit for driving the vehicle 10, and another example of the power unit is an internal combustion engine.

FIG. 4 shows a schematic shape of the frame 32. The frame 32 includes a main member 38 extending in the front-rear direction of the vehicle 10 on each of the left and right sides of the vehicle 10, and a sub-member 40 connecting the two main members 38. Three left wheels 34 and three electric motors 36 for driving them are fixed to the main member 38 on the left of the vehicle 10. Similarly, three right wheels 34 and three electric motors 36 for driving them are fixed to the main member 38 on the right of the vehicle 10.

Acceleration and deceleration of the vehicle 10 are performed by controlling the electric motor 36. Further, the vehicle 10 can be braked, for example, by using a regenerative brake realized by the control of the electric motor 36. The vehicle 10 may be provided with a mechanical brake on any wheel 34 for braking.

In addition, according to the vehicle 10 including the above-described chassis unit 30, by providing a difference between the rotational speeds of the three wheels 34 on the left side and the rotational speeds of the three wheels 34 on the right side, the vehicle 10 can be turned to the left and right. In the example shown in FIG. 4, each wheel 34 is a wheel having a general structure in which a tire is incorporated. Instead of such an example, in order to increase the degree of freedom of turning of the vehicle 10, for example, the four wheels 34 positioned at both ends in the front-rear direction may be replaced with wheels for omnidirectional movement (so-called omni wheels). Instead of these examples, for example, a steering mechanism may be used to turn the vehicle 10.

In addition, although the vehicle 10 of the first embodiment is a wheeled vehicle including the wheels 34, the vehicle 10 according to the present disclosure is not limited thereto, and may be configured as a tracked vehicle having an infinite track.

Figure 5:
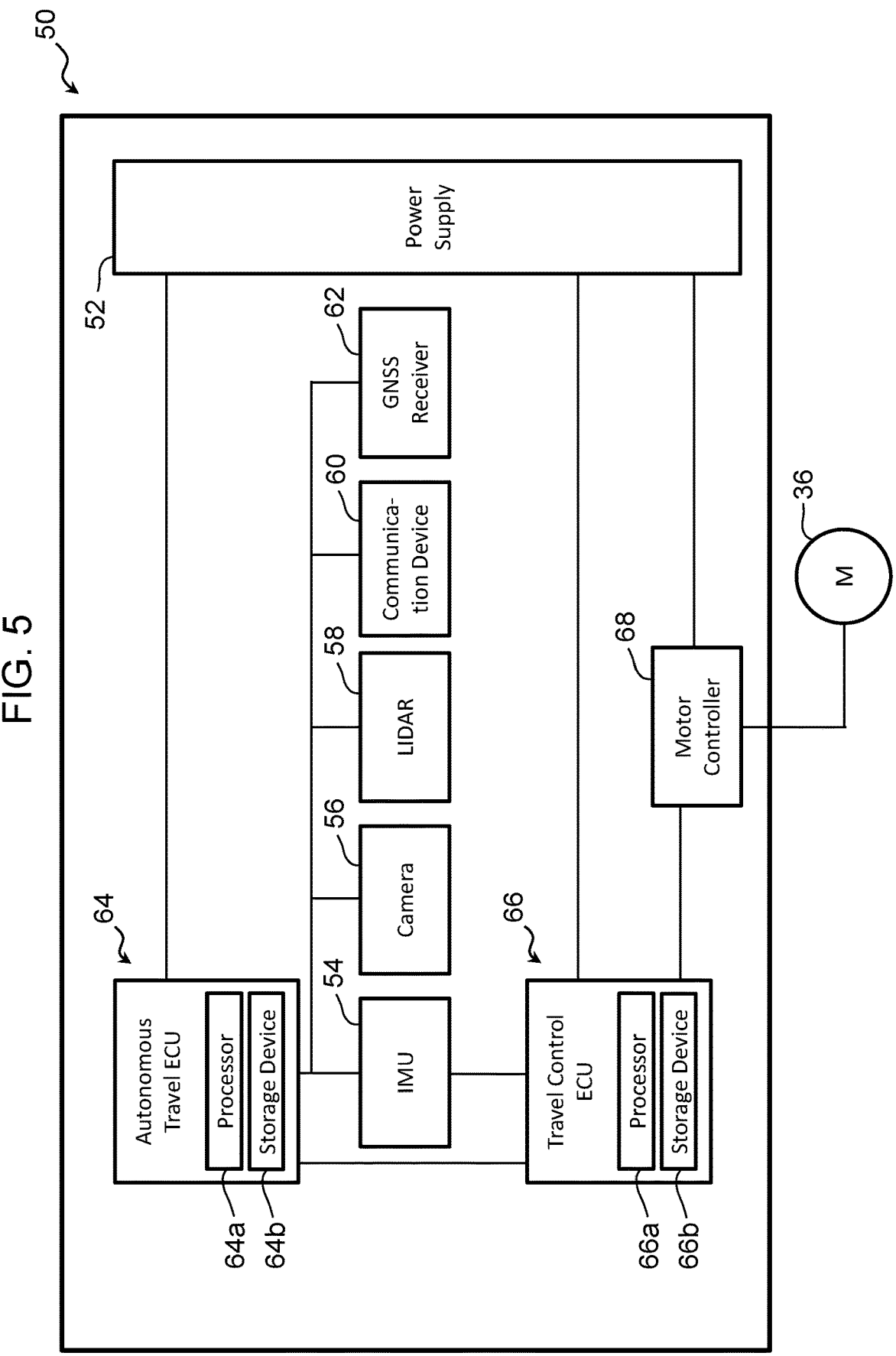
FIG. 5 is a block diagram schematically showing an example of a configuration of a control system mounted on the stand-up vehicle shown in FIG. 1.

FIG. 5 is a block diagram schematically showing an example of the configuration of a control system 50 for controlling the travel of the vehicle 10 shown in FIG. 1. The control system 50 is mounted on the vehicle 10. The control system 50 is configured to cause the vehicle 10 to autonomously travel.

As shown in FIG. 5, the control system 50 includes a power supply 52, an inertial measurement unit (IMU) 54, a camera 56, a laser imaging detection and ranging (LIDAR) 58, a communication device 60, a global navigation satellite system (GNSS) receiver 62, an autonomous travel electronic control unit (ECU) 64, a travel control ECU 66, and a motor controller 68. As shown in FIG. 1, the camera 56 is installed on each of the four support 16, and the LIDAR 58 is installed on the back surface of each of the two backrests 18. As shown in FIG. 2, the components 52, 54, 60 to 68 of the control system 50 other than the camera 56 and the LIDAR 58 are disposed between the frame 32 and the top plate 14.

The power supply 52 is typically a battery that is externally charged. The power supply 52 supplies power to each device (the electric motor 36, the control system 50, and a biometric information acquisition apparatus 80 (see FIG. 7) described later) mounted on the vehicle 10. IMU 54 detects angular velocities and accelerations of three axes. Therefore, according to IMU 54, it is possible to acquire various traveling states such as the speed, the accelerations, and the posture of the vehicle 10. The IMU 54 transmits the acquired traveling state to the autonomous travel ECU 64 and the travel control ECU 66.

The camera 56 and the LIDAR 58 are examples of an "external sensor" for recognizing the surrounding environment of the vehicle 10. The four cameras (outward facing cameras) 56 photograph the surroundings of the vehicle 10 (more specifically, the front right, front left, rear right, and rear left of the vehicle 10). The two LIDARS 58 respectively detect objects in front of and behind the vehicle 10. According to the LIDAR 58, the distance and the direction of the detected object from the vehicle 10 can be acquired. The camera 56 and the LIDAR 58 transmit the acquired information to the autonomous travel ECU 64. Instead of the example shown in FIGS. 1-2 and 3, only one of the camera 56 and the LIDAR 58 may be used.

The communication device 60 performs communication (transmission and reception) with a communication device 72c of a management server 72 (see FIG. 6) to be described later via a wireless communication network such as 4G or 5G. The communication device 60 communicates with a mobile terminal 3 (see FIG. 6), which will be described later, via a similar wireless communication network. The GNSS receiver 62 acquires the position and orientation of the vehicle 10 based on signals from GNSS satellites. The GNSS receiver 62 transmits the acquired information to the autonomous travel ECU 64.

The autonomous travel ECU 64 includes a processor 64a and a storage device 64b. The storage device 64b stores at least one program configured to cause the vehicle 10 to autonomously travel. The storage device 64b stores map information as a map database. Alternatively, the processor 64a may acquire the map information from a map database stored in the storage device 72b (see FIG. 6) of the management server 72.

In an example of a use of the vehicle 10 (an example of using a vehicle dispatch service described later), the destination is transmitted from the mobile terminals 3 of the users to the autonomous travel ECU 64 via the management server 72. The autonomous travel ECU 64 (processor 64a) sets a target travel route from the current position of the vehicle 10 to the destination and a target vehicle speed (target speed of the vehicle 10) based on the position information of the vehicle 10 from the GNSS receiver 62 and the map information of the map database. In addition, the processor 64a changes (updates) the set target travel route and the set target vehicle speed as necessary on the basis of the travel state information and the position information of the vehicle 10 based on the IMU54 and the GNSS receiver 62 and the information of the object around the vehicle 10 acquired by the camera 56 and the LIDAR 58.

The autonomous travel ECU 64 transmits the latest target travel route and target vehicle speed to the travel control ECU 66. The travel control ECU 66 includes a processor 66a and a storage device 66b. The storage device 66b stores various kinds of information necessary for controlling each electric motor 36 for autonomous traveling of the vehicle 10. The processor 66a generates a control command value (a command value such as a rotation speed and a rotation direction) of each electric motor 36 for causing the vehicle 10 to travel so as to realize the target travel route and the target vehicle speed. The processor 66a uses the information indicating the traveling state acquired by IMU 54 to generate the control command value.

The travel control ECU 66 commands the generated control command value of each electric motor 36 to each motor controller 68. The motor controller 68 includes a drive circuit that controls electric power supplied from the power supply 52 to the electric motors 36, and is provided for each of the six electric motors 36. Each motor controller 68 controls energization to each electric motor 36 according to a control command value from the travel control ECU 66.

According to the control by the autonomous travel ECU 64 and the travel control ECU 66 described above, the vehicle 10 can autonomously travel toward the destination.

1-2. Configuration Example of Operation Management System

Figure 6:
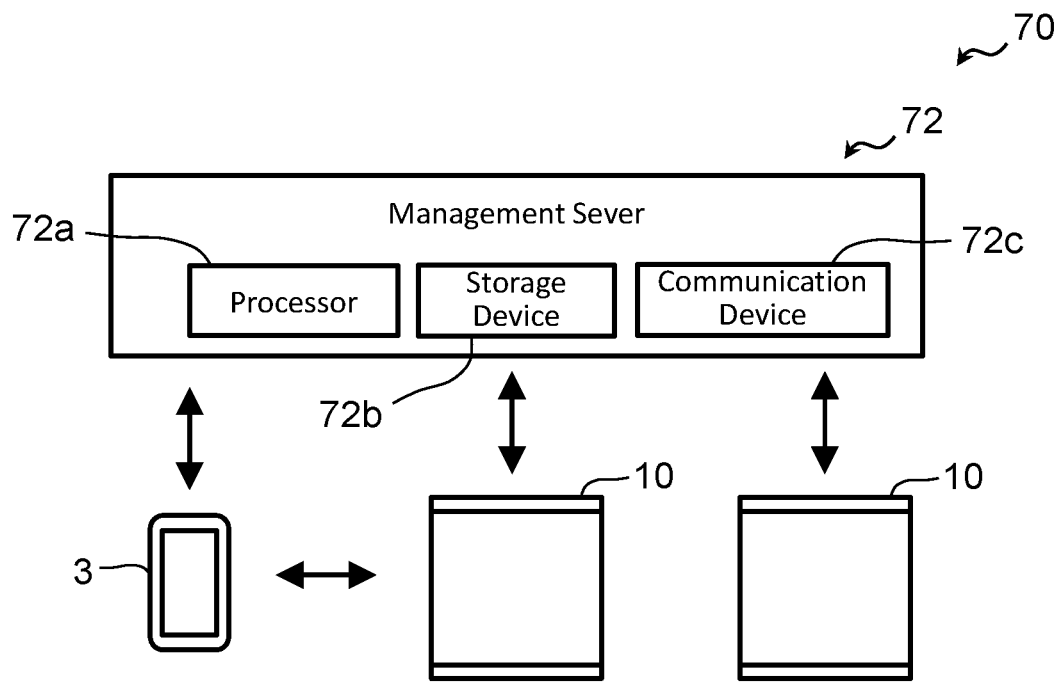
FIG. 6 is a block diagram schematically showing a configuration of an operation management system according to the first embodiment.

FIG. 6 is a block diagram schematically illustrating a configuration of an operation management system 70 according to the first embodiment. The vehicle 10 configured as described above can be used in various applications for moving people. One of the applications of such a vehicle 10 is a moving service for moving the user by performing autonomous traveling on a road on which a plurality of operation-managed vehicles 10 are planned to coexist with pedestrians. An example of a typical mobile service is a transportation service that brings the user to a desired destination.

The above-described moving service is provided with a vehicle allocation service for allocating the vehicle 10 in response to a request from the user, and thus is more convenient. In order to realize a mobile service involving vehicle dispatch, as shown in FIG. 6, the operation management system 70 includes a plurality of vehicles 10, a mobile terminal 3, and a management server 72. The mobile terminal 3 is carried by the user of the vehicle 10 and is, for example, a smartphone or a tablet personal computer. The mobile terminal 3 includes a processor, a storage device, and a communication device.

The management server 72 includes a processor 72a, a storage device 72b, and a communication device 72c. The storage device 72b stores at least one program for mobile services including vehicle dispatch. The processor 72a reads and executes a program stored in the storage device 72b. Accordingly, various functions for providing a moving service including vehicle dispatch are realized. For example, the management server 72 (communication device 72c) communicates with the communication device 60 of each vehicle 10 and the mobile terminal 3 via a wireless communication network. The management server 72 manages user information. Further, the management server 72 performs operation management of the plurality of vehicles 10 including the vehicle dispatch service. The operation management of the plurality of vehicles 10 by the management server 72 may include, for example, a remote operation of the vehicle 10 in an emergency by an operator via the management server 72.

The basic flow of the vehicle allocation service of the vehicle 10 is as follows. That is, when using the vehicle dispatch service, the user transmits the vehicle dispatch reservation information to the management server 72 using the mobile terminal 3. The vehicle dispatch reservation information includes a desired vehicle dispatch location and a destination. The management server 72 selects an appropriate vehicle 10 from among one or more vehicles 10 around the user, and transmits the vehicle dispatch reservation information to the selected vehicle 10. The vehicle 10 receiving the vehicle allocation reservation information autonomously travels toward the desired vehicle allocation place. The vehicle 10 provides a moving service (transportation service) for autonomously traveling toward a destination after picking up the user at a desired dispatch location.

In addition, the mobile service with vehicle dispatch may be provided with a ride-sharing service. The mobile service may be provided without the vehicle dispatch service. Specifically, for example, the user who desires to ride approaches the vehicle 10 traveling around the user. As a result, the vehicle 10 detects this user and stops. The user uses the mobile terminal 3 to perform a predetermined boarding process and then boards the vehicle 10. Alternatively, the mobile service may be provided without using the management server by using a boarding method in which the user visits a predetermined stop and boards the vehicle 10 waiting there. Further, the movement service is not limited to the example in which the vehicle 10 autonomously travels toward the destination set by the user. For example, the movement service may be a service in which the vehicle 10 circles while autonomously traveling on a predetermined route.

1-3. Biometric Information Acquisition Apparatus Using Handrail

Figure 7:
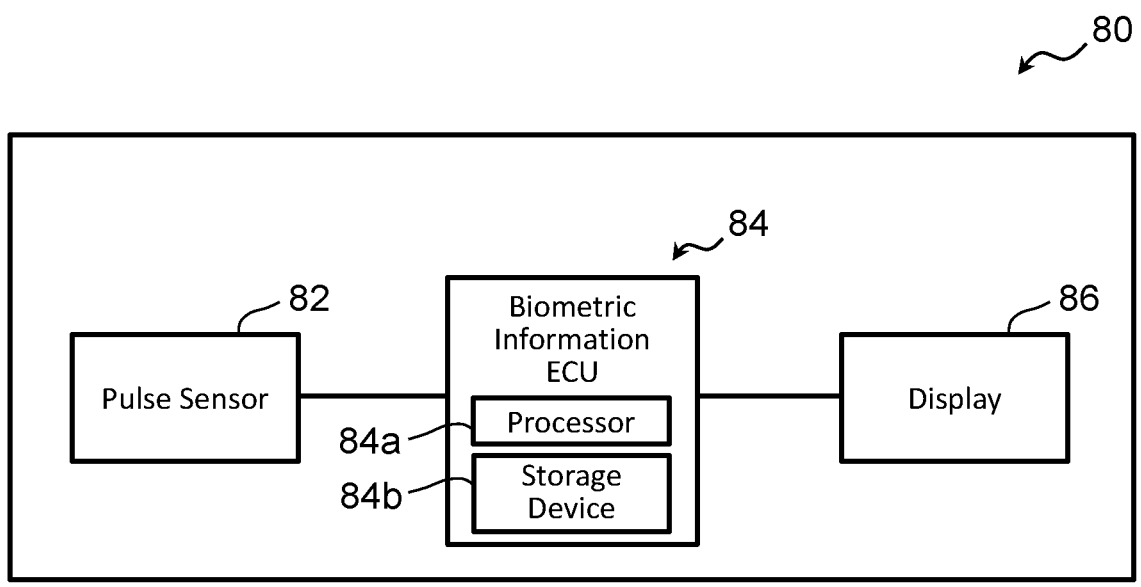
FIG. 7 is a block diagram schematically showing an example of a configuration of a biometric information acquisition apparatus according to the first embodiment.

FIG. 7 is a block diagram schematically illustrating an example of a configuration of a biometric information acquisition apparatus 80 according to the first embodiment. The vehicle 10 includes a biometric information acquisition apparatus 80 that acquires biometric information of the user. An example of the biometric information acquired in the first embodiment is a pulse. The biometric information acquisition apparatus 80 includes a pulse sensor (biometric information sensor) 82, biometric information ECU 84, and a display 86.

Figure 8:
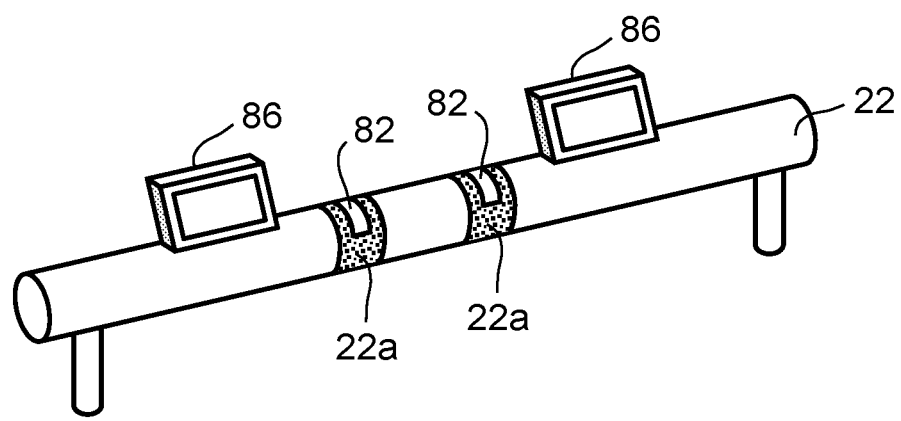
FIG. 8 is a perspective view showing an installation example of the pulse sensor and the display shown in FIG. 7.

FIG. 8 is a perspective view showing an installation example of the pulse sensor 82 and the display 86 shown in FIG. 7. The pulse sensor 82 is provided on the handrail 22. More specifically, FIG. 8 shows the structure of the handrail 22 disposed at each of the front and rear ends of the vehicle 10. As an example, two pulse sensors 82 are installed in each handrail 22 in accordance with the boarding capacity (four persons) of the vehicle 10. The pulse sensor 82 is installed at a portion that the user riding on the vehicle 10 touches when gripping the handrail 22. The pulse sensor 82 may be installed corresponding to one or more assumed riding positions 1 smaller than the riding capacity, for example, one pulse sensor may be installed in each handrail 22.

A method of detecting the pulse by the pulse sensor 82 is not particularly limited as long as the pulse can be acquired from the hand of the user gripping the handrail 22. For example, a method using a microphone or a method using a photoelectric pulse wave method can be used.

In addition, in order to urge the user to grip the installation site of the pulse sensor 82, the handrail 22 may include, for example, a grip portion 22a (see FIG. 8) having a color different from that of the surroundings or a a shape corresponding to the shape of a hand.

For example, the biometric information ECU 84 may be disposed between the frame 32 and the top plate 14 similarly to the components of the control system 50 such as the power supply 52, or may be disposed inside the handrail 22 when the handrail 22 has a hollow shape. In addition, as an example, one biometric information ECU 84 is provided in one vehicle 10 (in other words, is shared between the four pulse sensors 82). Instead of such an example, the biometric information ECU 84 may be provided for each pulse sensor 82 or for each handrail 22.

The biometric information ECU 84 includes a processor 84a and a storage device 84b. The storage device 84b stores at least one program related to measurement of biometric information (pulse) using a biometric information sensor (pulse sensor 82) and notification of biometric information to users. The processor 84a executes a program stored in the storage device 84b. Thus, various processes related to measurement and notification of biometric information are realized. Therefore, the processor 84a corresponds to an example of "one or more processors" according to the present disclosure. The storage device 84b temporarily stores the acquired biometric information, for example.

The biometric information ECU 84 does not necessarily need to be configured separately from the autonomous travel ECU 64 or the travel control ECU 66. That is, for example, the autonomous travel ECU 64 or the travel control ECU 66 may be configured to have the function of the biometric information ECU 84 without the biometric information ECU 84.

More specifically, the biometric information ECU 84 starts measurement of the pulse, for example, when a change in the output of the pulse sensor 82 is detected as the user grips the installation site of the pulse sensor 82. The measurement of the pulse by the biometric information ECU 84 may be performed, for example, only for a time required for the detection of the pulse by the pulse sensor 82, or may be continuously performed while the user is gripping the handrail 22.

The biometric information ECU 84 transmits the pulse detected by the pulse sensor 82 to the display 86. The display 86 displays the received pulse. The display 86 is installed on, for example, the handrail 22, and faces the user who stands at the assumed riding position 1 and is "a detection target of biometric information (pulse)" (for example, refer to the user 2 in FIG. 2). As an example, the number of displays 86 corresponding to the number of pulse sensors 82 is installed on the vehicle 10 (handrail 22).

As described above, in the first embodiment, the "notification process" of the biometric information to the users by the biometric information ECU 84 corresponds to a process of displaying the biometric information on the display 86. The biometric information ECU 84 may calculate a heart rate from pulse information detected by the pulse sensor 82 and display the heart rate on the display 86.

1-4. Effect

As described above, with the vehicle 10 according to the first embodiment, the user can acquire biometric information (pulse) during boarding by using the biometric information acquisition apparatus 80. The pulse sensor 82 is provided on the handrail 22 of the stand-up vehicle 10. Therefore, the user can acquire his/her pulse only by gripping the handrail 22 to ensure safety during riding. That is, according to the vehicle 10, the user can acquire his/her own biometric information without taking special time and effort while riding.

In addition, the user can perform health management by using the boarding opportunity of the vehicle 10. This leads to promotion of use of the vehicle 10. Further, according to the present configuration in which the pulse sensor 82 is provided in the handrail 22, it is possible to give the user an incentive to grip the handrail 22. Therefore, the safety of the user in the mobile service using the vehicle 10 can be improved.

1-5. Other Examples of Handrails

In the example shown in FIG. 8 described above, the handrails 22 having the biometric information acquisition function are attached to the supports 16 located at the four corners of the vehicle 10. However, the "handrail" according to the present disclosure may be formed so as to extend directly from the top plate, for example. In addition, various appliances for improving the convenience of the user, such as a table 20 (see FIG. 1), can be attached to the top plate of the vehicle 10 according to the present disclosure. The "handrail" may be attached to a variety of such appliances.

Figure 9:
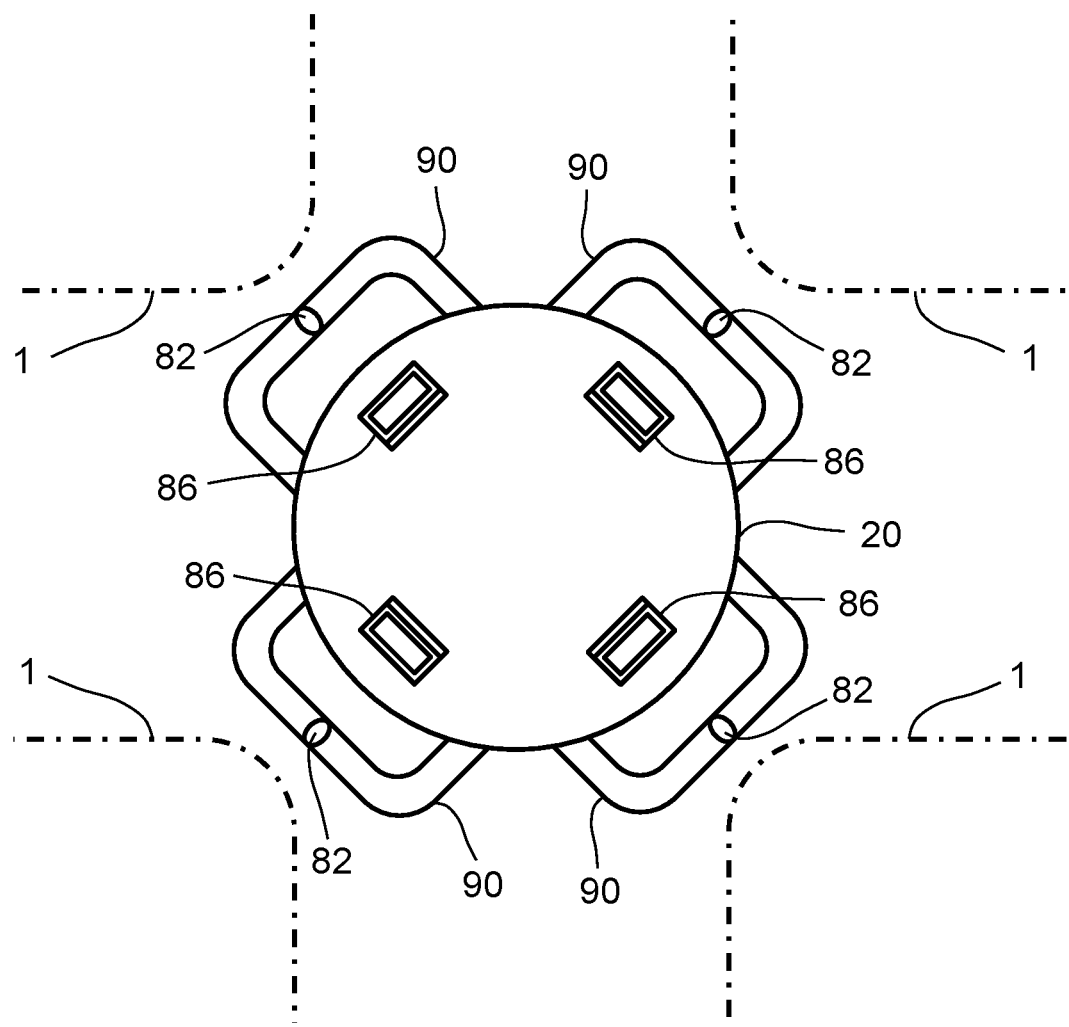
FIG. 9 is a plan view showing a modified example of the handrail according to the first embodiment.

FIG. 9 is a diagram illustrating a modified example of the handrail according to the first embodiment. More specifically, FIG. 9 is a plan view of the table 20 on the vehicle 10 as in FIG. 3. In the example shown in FIG. 9, a handrail 90 is attached to the table 20. As an example, the handrail 90 is provided at a position corresponding to each of the assumed riding positions 1 for four persons of the vehicle 10. A pulse sensor 82 is attached to each handrail 90. A display 86 is provided on the table 20 at a position corresponding to each handrail 90.

1-6. Other Examples of Biometric Information from a Handrail

The biometric information acquired by using the handrail (for example, the handrail 22) of the vehicle 10 is not limited to the pulse (or the heart rate) as long as the biometric information can be acquired only by the user gripping the handrail. That is, the biometric information from the handrail may be, for example, weight or body composition information of the user as described below.

Figure 10:
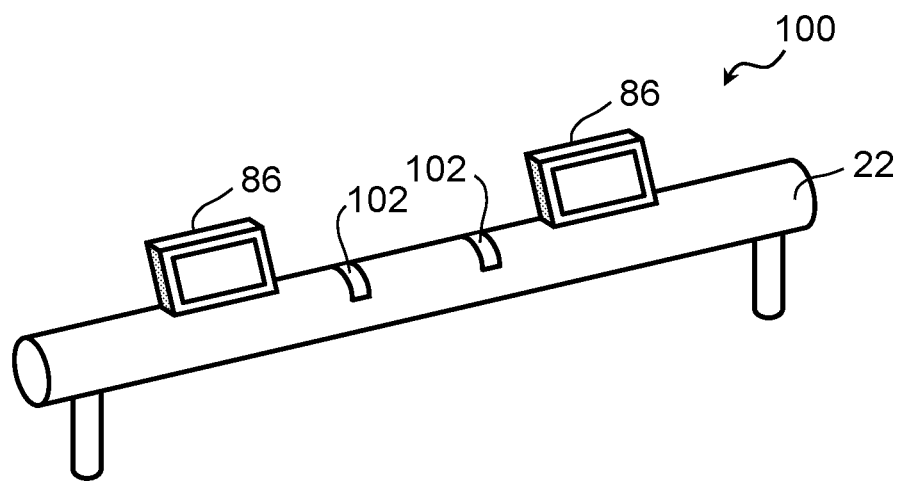
FIG. 10 is a perspective view showing another modified example of the biometric information acquisition apparatus according to the first embodiment.

FIG. 10 is a diagram for explaining another modified example of the biometric information acquisition apparatus according to the first embodiment. The biometric information acquisition apparatus 100 illustrated in FIG. 10 includes a body temperature sensor 102 together with a biometric information ECU (not illustrated) and a display 86 similar to those of the biometric information ECU 84 and the display 86, respectively. The body temperature sensor 102 is provided, for example, on the handrail 22. In addition, in still another example of the biometric information acquisition apparatus, both the pulse sensor 82 and the body temperature sensor 102 may be provided in the handrail 22 so as to detect the pulse from one hand of the user and the body temperature from the other hand.

Figure 11:
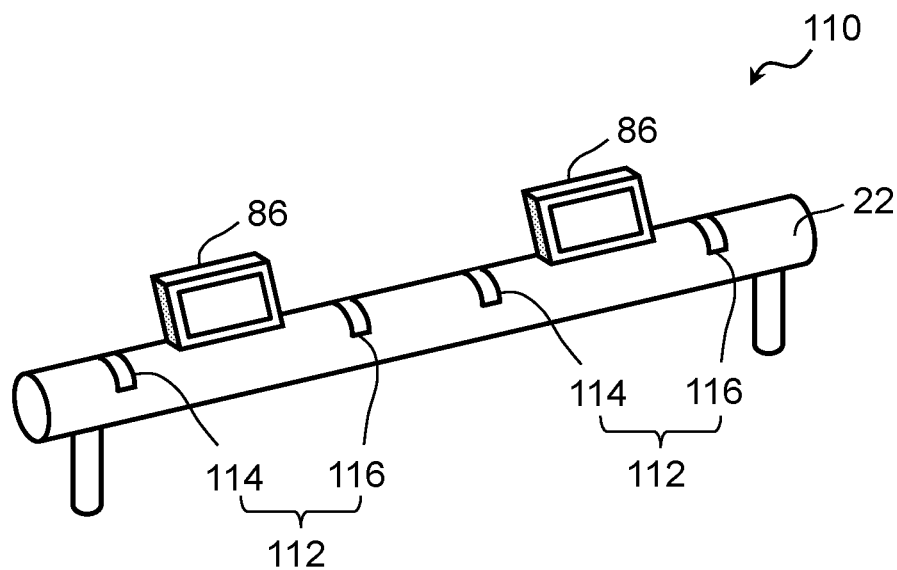
FIG. 11 is a perspective view showing still another modified example of the biometric information acquisition apparatus according to the first embodiment.

FIG. 11 is a diagram for another modified example of the biometric information acquisition apparatus according to the first embodiment. The biometric information acquisition apparatus 110 illustrated in FIG. 11 includes a body composition sensor 112 together with a biometric information ECU (not illustrated) and a display 86 similar to those of the biometric information ECU 84 and the display 86, respectively. The body composition sensor 112 is provided, for example, on the handrail 22. The body composition sensor 112 is a sensor using bioelectrical impedance analysis, and includes a pair of electrodes 114 and 116 provided on the handrail 22. The body composition sensor 112 detects body composition information when both hands of the user gripping the handrail 22 on the vehicle 10 are in contact with the pair of electrodes 114 and 116.

More specifically, the biometric information acquisition apparatus 110 is configured to calculate (estimate) the body composition based on an electrical resistance value measured when a weak current is applied to both hands of the user via the pair of electrodes 114 and 116. As a result, the user can acquire the body composition information such as the body fat percentage, the muscle mass, and the body moisture percentage while riding. The body composition sensor 112 may be provided on the handrail 22 together with at least one of the pulse sensor 82 and the body temperature sensor 102.

1-7. Other Examples of Notification Processing.

Figure 12:
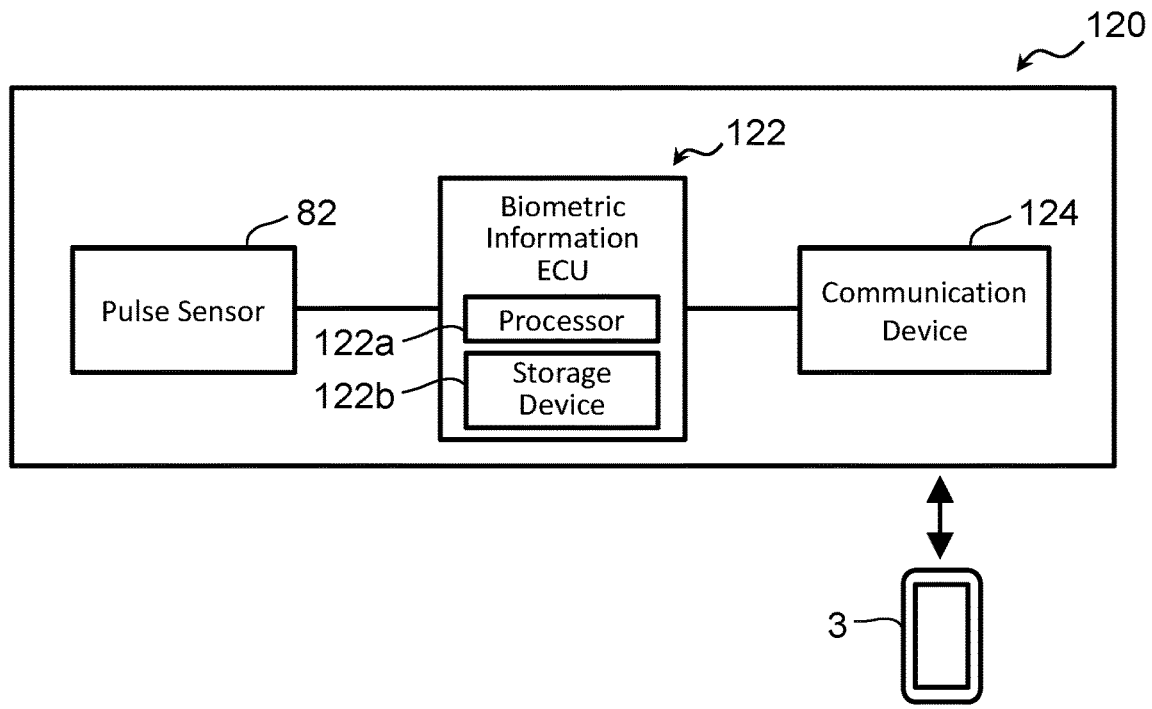
FIG. 12 is a block diagram schematically showing a modified example of the notification process of notifying a user of biometric information.

FIG. 12 is a block diagram for explaining a modified example of the process of notifying the user of biometric information. The biometric information acquisition apparatus 120 illustrated in FIG. 12 includes a biometric information sensor (for example, a pulse sensor 82), biometric information ECU 122 including a processor 122a and a storage device 122b, and a communication device 124. The communication device 124 communicates with the mobile terminal 3 of the user and the communication device 60 of the vehicle 10 via the wireless communication network.

The biometric information acquisition apparatus 120 is typically mounted on the vehicle 10 used for the above-described moving service involving vehicle dispatch. In such a moving service, when the vehicle 10 arrives under the vehicle allocation requester by the vehicle allocation service, the personal authentication process is performed via the communication device 124. The personal authentication process is a process of confirming that the users who carry the mobile terminals 3 and are going to board the vehicle are actually vehicle allocation requesters, and is performed by, for example, an autonomous travel ECU 64. To be specific, in the personal authentication process, the autonomous travel ECU 64 performs wireless communication with the mobile terminal 3 located in the vicinity of the vehicle 10, and directly acquires ID information (for example, a PIN code) registered in the mobile terminal 3. Then, the autonomous travel ECU 64 collates the ID information directly acquired from the mobile terminal 3 by wireless communication with the ID information of the users acquired from the management server 72 that performs vehicle allocation. When they match, the autonomous travel ECU 64 authenticates the user of the mobile terminal 3 as the vehicle allocation requester.

The notification processing of the biometric information by the biometric information acquisition apparatus 120 illustrated in FIG. 12 is performed as follows, for example. That is, the biometric information ECU 122 (the processor 122a) communicates with the autonomous travel ECU 64 via the communication device 60 and checks whether or not the personal authentication process is successful when the users get on the vehicle 10. When the personal authentication process is successful, the biometric information ECU 122 communicates with the mobile terminals 3 of the users who are going to board the vehicle 10 via the communication device 124, and transmits information for notifying the designated boarding position (any of the assumed riding positions 1 illustrated in FIG. 3) to the mobile terminals 3. Alternatively, for example, the vehicle 10 may be configured to include a lighting device (not illustrated) such as an LED on the riding surface 12 to illuminate the riding surface 12 around the designated riding position in order to notify the user of the designated riding position. Then, after the acquisition of the biometric information of the users is completed at the designated boarding position after boarding, the biometric information ECU 122 transmits the acquired biometric information to the mobile terminals 3 of the users (that is, "users whose biometric information is to be detected") via the communication device 124.

In an example of the vehicle 10 including a speaker, the "notification process" performed by the "one or more processors" according to the present disclosure may notify the user of the biometric information detected by the biometric information sensor by voice using the speaker. In addition, the "notification process" may be performed by arbitrarily combining the above-described methods using the display 86, the mobile terminal 3, and the speaker.

2. Second Embodiment

In the first embodiment described above, the handrail 22 of the stand-up vehicle 10 is used for installation of the biometric information sensor. In contrast, in the second embodiment, a riding surface (deck) of a stand-up vehicle is used for installation of the biometric information sensor.

2-1. Acquisition of Biometric Information Using Riding Surface

Figure 13:
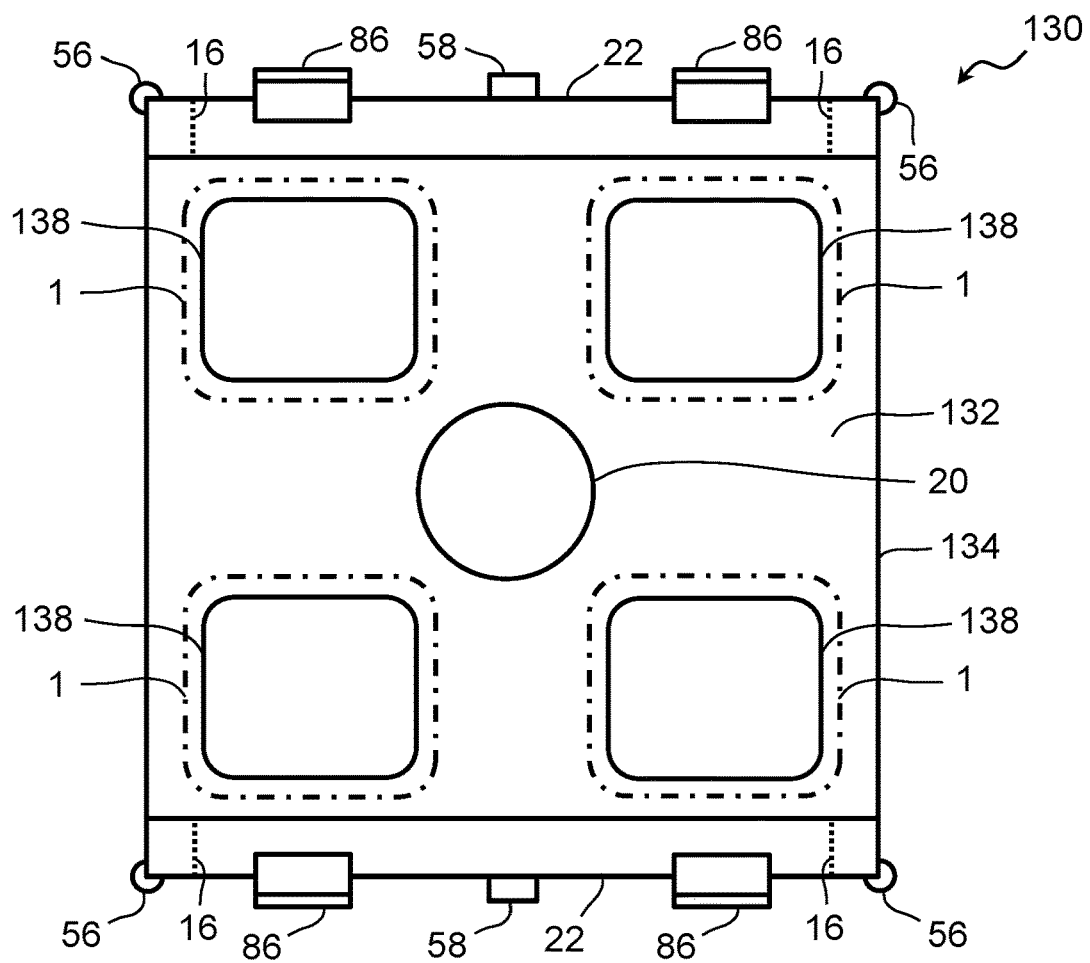
FIG. 13 is a plan view of a stand-up vehicle according to a second embodiment.
Figure 14:
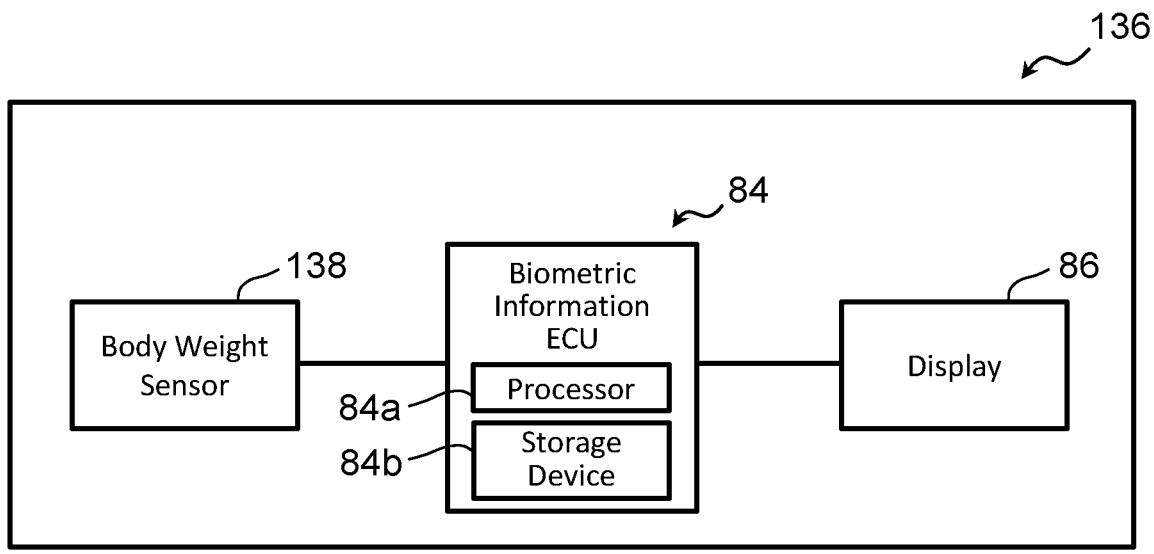
FIG. 14 is a block diagram schematically showing an example of a configuration of a biometric information acquisition apparatus according to the second embodiment.

FIG. 13 is a plan view of a stand-up vehicle 130 according to the second embodiment. FIG. 14 is a block diagram schematically illustrating an example of a configuration of a biometric information acquisition apparatus 136 according to the second embodiment. The configuration of the vehicle 130 according to the second embodiment is the same as the configuration of the vehicle 10 according to first embodiment except for the points described below.

The vehicle 130 includes a top plate 134 having a riding surface 132. The vehicle 130 includes a biometric information acquisition apparatus 136. An example of the biometric information acquired using the riding surface 132 in the second embodiment is the weight of the user. The biometric information acquisition apparatus 136 includes a weight sensor (biometric information sensor) 138, together with the same biometric information ECU 84 and display 86 as those mounted on the vehicle 10 of the first embodiment.

The weight sensor 138 is provided below the riding surface 132 and uses the riding surface 132 as a weight detection surface. More specifically, in the example shown in FIG. 13, the weight sensor 138 is provided inside the top plate 134, which is an example of "arranged below the riding surface" according to the present disclosure. As an example, the weight sensor 138 is provided at a position corresponding to the assumed riding positions 1 of the respective riding capacities (four persons) of the vehicle 130. However, the weight sensor 138 may be installed corresponding to one or more assumed riding positions 1 less than the riding capacity.

For example, the biometric information ECU 84 (processor 84a) starts measurement of the weight after detecting boarding of the users based on the output of the weight sensor 138. In the configuration example shown in FIG. 13, the biometric information ECU 84 notifies users of the weight detected by the weight sensor 138 by using the display 86 provided on the handrail 22. Also in the example of weight acquisition in the second embodiment, the display 86 may be provided at a position other than the handrail 22 (for example, the table 20 shown in FIG. 9). The weight acquired by using the weight sensor 138 may be transmitted to the mobile terminal 3 of the user as in the example illustrated in FIG. 12.

In addition, for accurate weight measurement, the biometric information ECU 84 may prompt the user to avoid leaning against the handrail 22 by using the display 86 corresponding to the assumed riding position 1 of the user. In an example in which the vehicle 130 includes a speaker, such an alert may be performed using the speaker instead of the display 86. In addition, the biometric information ECU 84 may control the acquisition timing of the weight so that the acquisition is performed while the vehicle 130 is stopped in order to remove the influence of vibration or the like during traveling of the vehicle 130.

2-2. Effect

The vehicle 130 according to the second embodiment, which uses the riding surface 132 to acquire biometric information (weight), also allows the user to acquire his/her own biometric information without taking special time and effort during riding.

2-3. Other Examples of Weight Acquisition

Figure 15:
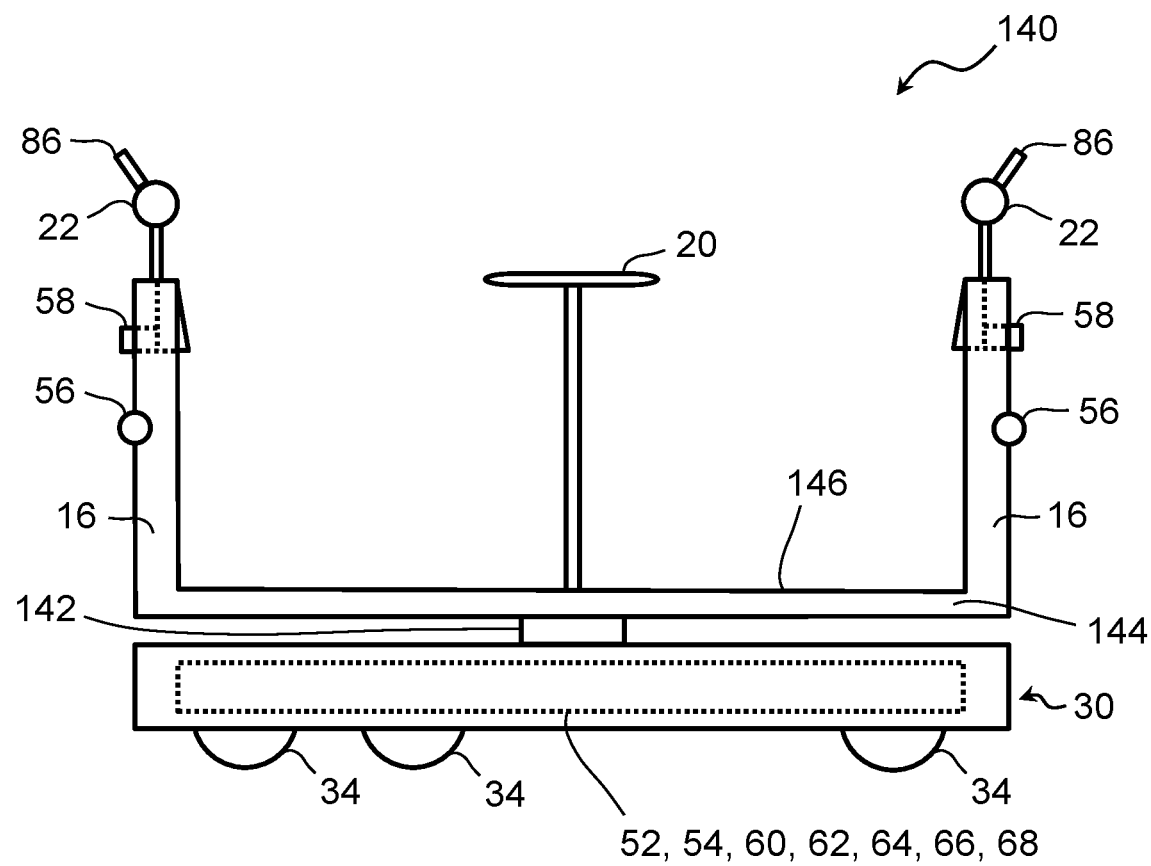
FIG. 15 is a side view for explaining a modified example of the configuration of the stand-up vehicle according to the second embodiment.

FIG. 15 is a side view for explaining a modified example of the configuration of a stand-up vehicle according to the second embodiment. A vehicle 140 according to the modified example of the second embodiment may include a load sensor below the top plate for the purpose of detecting that the user has boarded the vehicle 140. The vehicle 140 shown in FIG. 15 includes such a load sensor 142 below the top plate 144 (more specifically, a portion between the top plate 144 and the chassis unit 30). The load sensor 142 detects a load acting on the top plate 14 using a riding surface 146 of the top plate 144 as a detection surface. In such an example of the vehicle 140, the load sensor 142 may be used as a weight sensor. The installation location of the load sensor 142 corresponds to another example of "below the riding surface" according to the present disclosure.

Figure 16:
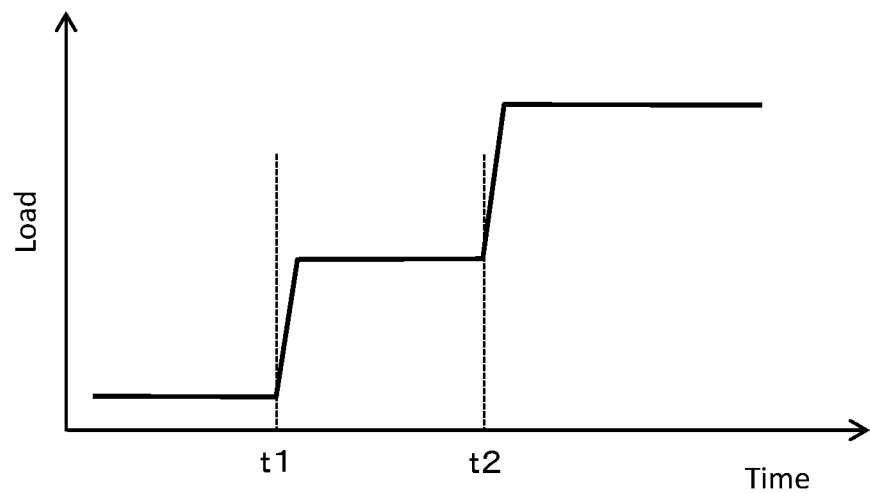
FIG. 16 is a graph for explaining an example of a method of acquiring a weight using the load sensor shown in FIG. 15.

FIG. 16 is a graph for explaining an example of a method of acquiring the weight using the load sensor 142 shown in FIG. 15. The load detected by the load sensor 142 changes as the user gets on the vehicle 140. To be more specific, when one users ride in the vehicle 140, the load detected by the load sensor 142 increases as indicated by a waveform at time t1 shown in FIG. 16. Thereafter, when one more uses ride, the load increases as shown by the waveform at time t2.

Therefore, for example, the processor (not shown) of the biometric information acquisition apparatus may calculate, as the weight of the user, the amount of increase in the load detected by the load sensor 142 serving as a weight sensor along with the boarding of the user who has completed the personal authentication process by the above-described method. Then, the processor may perform a process (notification process) of transmitting the calculated weight to the mobile terminal 3 of the user. In addition, according to such a method, it is also possible to sequentially acquire the weights of a plurality of users at the time of boarding, except for a case where a plurality of users simultaneously board the vehicle 140.

In still another example, the stand-up vehicle according to the present disclosure may be configured to acquire biometric information such as a pulse using the handrail 22 or 90 according to the first embodiment, in addition to acquiring a weight using the riding surface 132 according to the second embodiment or the riding surface 146 according to the modified example of the second embodiment.

3. Third Embodiment

3-1. Surface Structure of a Display for Displaying Biometric Information

Figure 17:
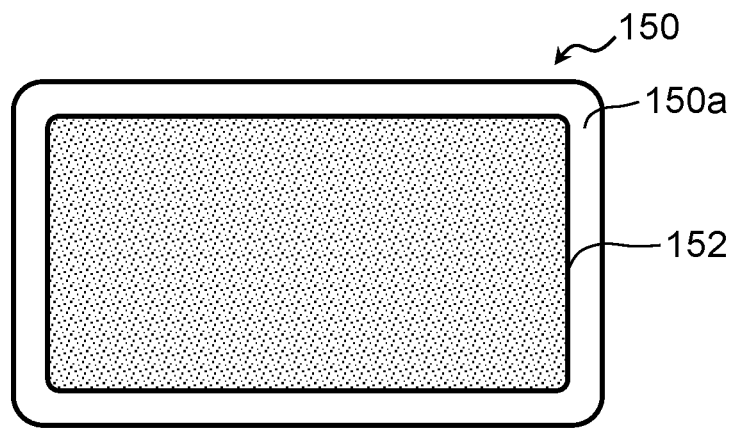
FIG. 17 is a diagram for explaining an example of a configuration of a display according to a third embodiment.

FIG. 17 is a diagram for explaining an example of a configuration of a display 150 according to a third embodiment. The display 150 is mounted on the vehicles 10, 130 and 140 for displaying biometric information such as a pulse or a weight in the "notification process". The display 150 is provided on the handrail 22 as an example.

Similarly to the display 86 illustrated in FIG. 2, the display 150 is disposed so as to face the user who stands at the assumed riding position 1 and is the "detection target of biometric information". That is, the orientation of the display 150 is determined in consideration of the line of sight of the user standing at the assumed riding position 1. In addition, a film 152 is attached to the display screen 150a of the display 150 of the third embodiment to suppress peeping from surrounding people (mainly, other users on board). The film 152 is in close contact with the display screen 150a.

The film 152 has a structure for limiting the viewing angle of the display 150 within a predetermined range. The viewing angle refers to an angle at which the display 150 can be seen without change in brightness and color with reference to the front of the display 150. More specifically, the film 152 is formed such that at least one of the viewing angles of the display 150 in the horizontal and vertical directions is limited in consideration of the installation location of the display 150 on the vehicle in order to suppress peeping from surrounding people. The film 152 having a structure capable of limiting the viewing angle is, for example, a louver array film having a fine louver structure.

3-2. Effect

The display 150 according to the third embodiment described above has a surface structure that limits the viewing angle within a predetermined range by using the film 152 attached to the display screen 150a. Such a display 150 is suitable for displaying biometric information while making it difficult for other users to know the biometric information in a vehicle used for a mobile service involving a ride-sharing service in which the user may ride together with a stranger.

3-3. Other Examples of Display Surface Structures

The above-described display 150 is provided with a surface structure viewing angle within a predetermined range by using a film 152 separate from the display screen 150a. Instead of such an example, the "display" according to the present disclosure may have a surface structure (for example, the above-described louver structure) that limits the viewing angle within a predetermined range by processing performed on the display screen itself.

Figure 18A:
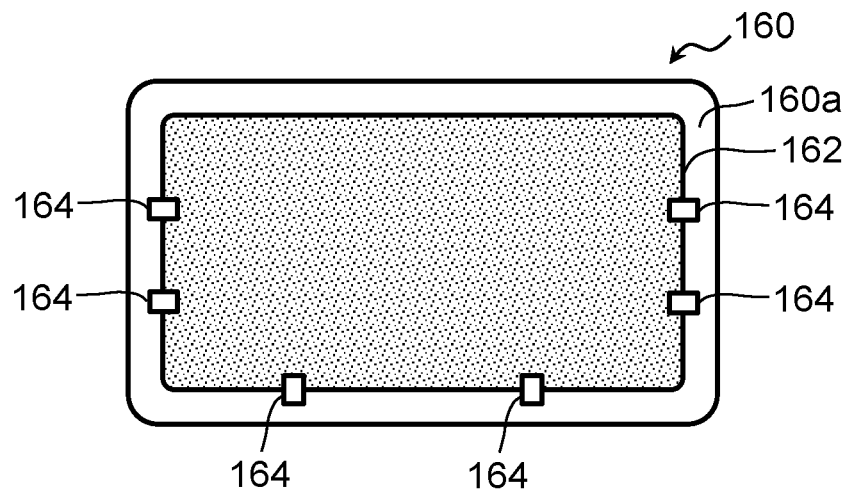
FIG. 18A is a diagram for explaining a modified example of the configuration of the display according to the third embodiment.
Figure 18B:
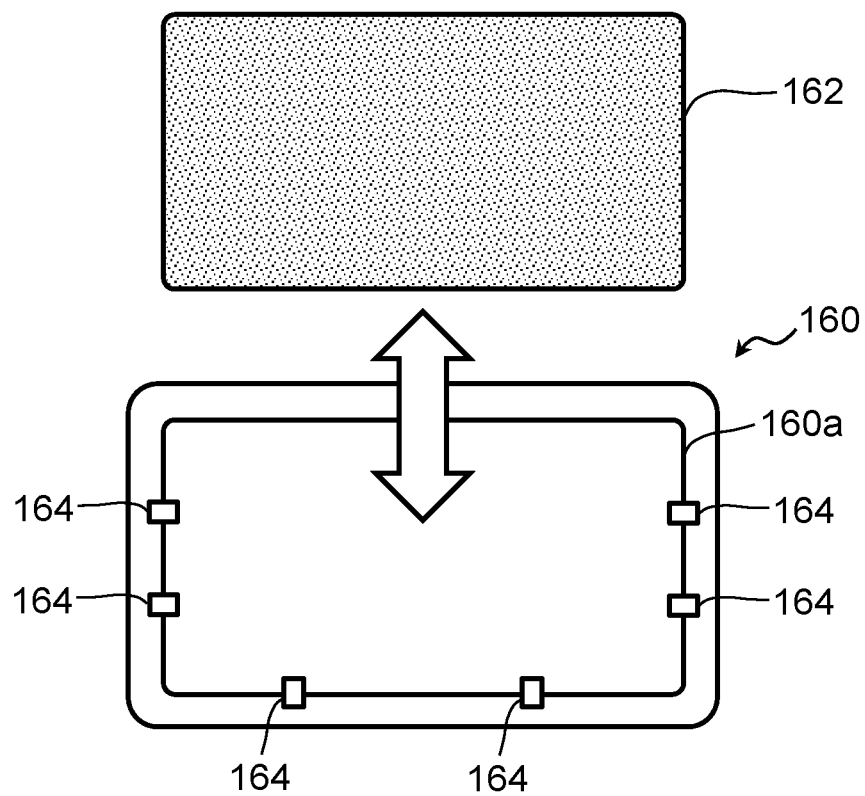
FIG. 18B is a diagram for explaining the modified example of the configuration of the display according to the third embodiment in which a film is detached from the display.

FIGS. 18A and 18B are diagrams for explaining a modified example of the configuration of the display according to the third embodiment. As shown in FIG. 18A, a film 162 having a louver structure similar to that of the film 152 shown in FIG. 17 is attached to the display screen 160a of the display 160. However, unlike the film 152 that is in close contact with the display screen 150a, the film 162 is attached to the display screen 160a using a plurality of (for example, six) claws 164. These claws 164 are not provided on one side (the upper side in the example shown in FIG. 18A) of the display 160. Therefore, by sliding the film 162 in one direction (upward) as shown in FIG. 18B, the film 162 can be easily attached to and detached from the display 160.

The removable film 162 is convenient when the user wants to check his/her biometric information together with the fellow passenger.

4. Fourth Embodiment

4-1. Abnormality Determination and Reporting of Biometric Information

In the fourth embodiment, a stand-up vehicle having a handrail provided with a pulse sensor as a biometric information sensor executes the following "abnormality determination process" and "report process". Hereinafter, the vehicle 10 of the first embodiment will be described as an example of such a stand-up vehicle.

Figure 19:
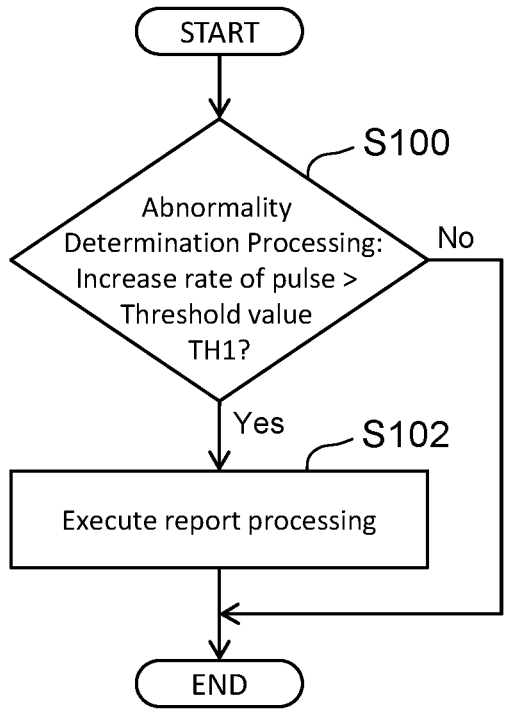
FIG. 19 is a flowchart showing processing of a biometric information ECU according to a fourth embodiment.

FIG. 19 is a flowchart illustrating processing of biometric information ECU 84 according to the fourth embodiment. The biometric information ECU 84 (see FIG. 7) of the vehicle 10 executes the processing of this flowchart during the measurement of the pulse using the pulse sensor 82. It is assumed that the measurement of the pulse based on the biometric information ECU 84 is performed continuously while the user holds the handrail 22 or for a predetermined time longer than the time required for the detection of the pulse by the pulse sensor 82.

In step S100, the biometric information ECU84 (processor 84a) executes abnormality determination processing for determining whether or not there is an abnormality in the pulse detected by the pulse sensor 82. To be specific, in the example of the abnormality determination process of step S100, the biometric information ECU 84 determines whether or not the time increase rate of the pulse is higher than a predetermined threshold TH1 based on the waveform of the pulse detected by the pulse sensor 82. The threshold TH1 is set in advance as a value with which it can be determined that the time increase rate of the pulse is an abnormally high value indicating a sudden change in physical condition. The threshold TH1 corresponds to an example of a "first threshold" according to the present disclosure.

In step S100, when the time increase rate of the pulse is equal to or less than the threshold TH1 (that is, when no abnormality is recognized in the pulse), the biometric information ECU 84 ends the processing in the current cycle. On the other hand, when the time increase rate of the pulse is higher than the threshold TH1 (that is, when the pulse is abnormal), the process proceeds to step S102.

In step S102, the biometric information ECU 84 executes a report process of notifying the outside of the vehicle 10 of a request for rescue of the users. For example, the biometric information ECU 84 notifies the management server 72 of a request for rescue by using the communication device 60 mounted on the vehicle 10. The notification by the report process includes, for example, transmission of current position information of the vehicle 10 acquired by using the GNSS receiver 62.

In addition, in an example in which information necessary for communicating with stores or hospitals around the vehicle 10, or reception destinations of ambulances is stored in the storage device 84b, the biometric information ECU84 may notify any of them by using the communication device 60. In addition, in an example in which the vehicle 10 includes a speaker, the biometric information ECU84 may notify people around the vehicle 10 using the speaker.

When the report process of step S102 is executed, the control system 50 of the vehicle 10 may continue the autonomous traveling of the vehicle 130 toward the destination or may stop the autonomous traveling. This also applies to the following fifth embodiment.

4-2. Effect

According to fourth embodiment described above, it is possible to provide the stand-up vehicle 10 capable of detecting an abnormal pulse (sudden change in physical condition) of the user in the vehicle 10 and quickly notifying the outside of a request for rescue. Therefore, even in a situation where it is difficult for the user himself/herself to seek help from the surroundings due to a sudden change in physical condition, it is possible to quickly seek help.

4-3. Another Example of Abnormality Determination Processing

An example of a pulse abnormality determined by the "abnormality determination process" according to the present disclosure is not limited to the above-described sudden increase in pulse, and may be, for example, the occurrence of a sudden arrhythmia. The presence or absence of the occurrence of sudden arrhythmias may be determined based on, for example, whether or not the amount of change in the interval between pulse waves during the measurement period is greater than a predetermined value, based on the pulse waveform during the measurement period of the pulse by the biometric information ECU 84.

The "abnormality determination process" according to the present disclosure may be a process of determining the presence or absence of an abnormality (for example, a body temperature being higher than a predetermined temperature) in biometric information other than the pulse relating to the physical condition of the user.

5. Fifth Embodiment 5-1. Abnormality Determination and Reporting Using Weight Sensor In a fifth embodiment, the following "abnormality determination process" and "report process" are executed using a weight sensor as a biometric information sensor. Hereinafter, the vehicle 130 of the second embodiment will be described as an example of such a stand-up vehicle. However, the same abnormality determination process and report process may be executed in the vehicle 140 (see FIG. 15) using the load sensor 142.

Figure 20:
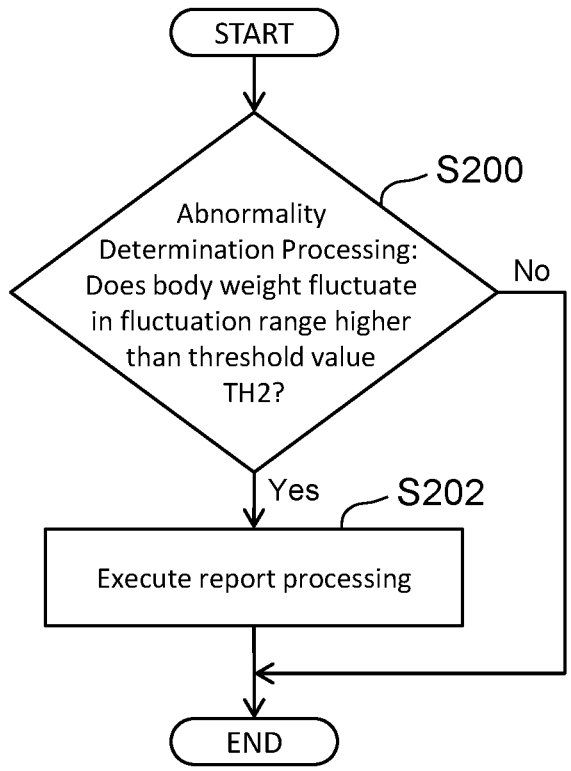
FIG. 20 is a flowchart illustrating an example of processing of a biometric information ECU according to a fifth embodiment.

FIG. 20 is a flowchart illustrating an example of processing of biometric information ECU 84 according to the fifth embodiment. The biometric information ECU 84 executes the processing of this flowchart while the users are on board. More specifically, the process of this flowchart is executed not only when the weight sensor 138 is measuring the weight for the purpose of notifying the user, but also during a period in which the weight sensor 138 is outputting a signal associated with the user getting on the vehicle 130.

In step S200, the biometric information ECU 84 (processor 84a) of the vehicle 130 executes abnormality determination processing. The abnormality determination process determines whether or not there is an abnormality in the weight detected by the weight sensor 138. To be specific, in the example of the abnormality determination process of step S200, the biometric information ECU 84 determines whether or not the body weight varies with a variation width higher than a predetermined threshold TH2 based on the waveform of the body weight detected by the body weight sensor 138. The threshold TH2 is set in advance as a value capable of determining that the variation width of the weight is an abnormally high value that does not occur in a normal state. The threshold TH2 corresponds to an example of a "second threshold" according to the present disclosure.

In step S200, in a case where the weight does not fluctuate with a fluctuation width higher than the threshold TH2 (that is, in a case where the weight sensor 138 does not detect abnormal vibration on the vehicle 130), the biometric information ECU 84 ends the processing in the current cycle.

On the other hand, in step S200, in a case where the weight fluctuates with a fluctuation width higher than the threshold TH2 (that is, in a case where the weight sensor 138 detects abnormal vibration on the vehicle 130), the process proceeds to step S202.

As described above, when the weight sensor 138 detects abnormal vibration on the vehicle 130, there is a possibility that the user on the vehicle 130 is in danger. Therefore, in step S202, the biometric information ECU 84 executes a report process of notifying the outside of the vehicle 10 of a request for rescue of users. For example, the biometric information ECU 84 notifies the management server 72 of a request for rescue by using the communication device 60 mounted on the vehicle 10. In addition, in an example in which information necessary for communicating with a store around the vehicle 10 or the police is stored in the storage device 84b, the biometric information ECU 84 may notify any of them by using the communication device 60. In addition, in an example in which the vehicle 10 includes a speaker, the biometric information ECU 84 may notify people around the vehicle 10 using the speaker.

5-2. Effect

According to the fifth embodiment described above, it is possible to provide the stand-up vehicle 130 capable of detecting (estimating) an abnormality on the vehicle 130 by using the fact that the biometric information (weight information) detected by the weight sensor 138 indicates an abnormality while the user is riding the vehicle 130, and capable of promptly notifying the outside of a request for rescue. In addition, as can be seen from the above description of the configuration of the vehicle 130, the riding space of the vehicle 130 is not isolated from the outside. Further, the vehicle 130 may be used for a mobile service involving a ride-sharing service in which the user may ride together with a stranger. According to the fifth embodiment, it is possible to provide the vehicle 130 suitable for a mobile service with excellent crime prevention.

5-3. Recording Processing Accompanying Abnormality Determination Processing

The abnormality determination process using the weight sensor 138 may be executed with the following recording process, for example.

Figure 21:
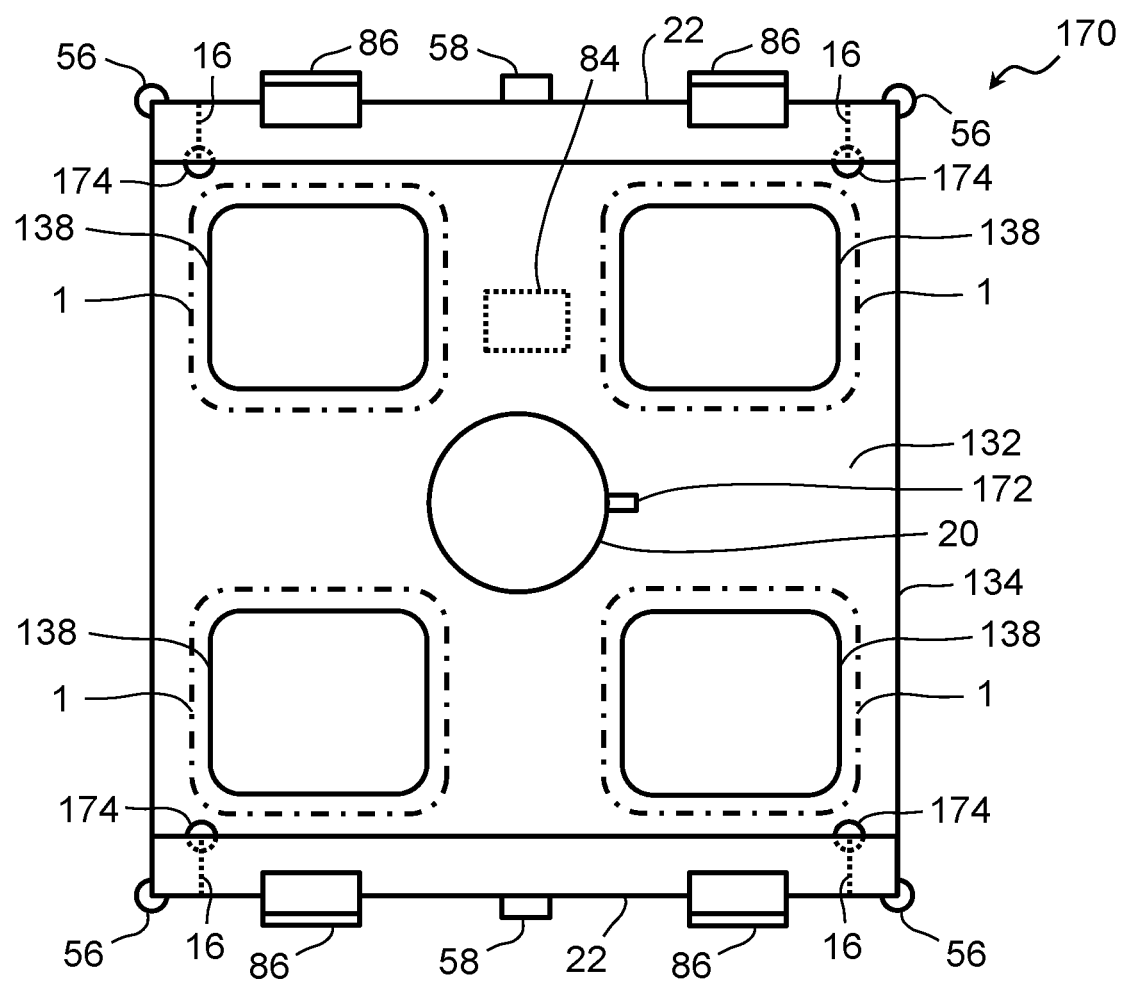
FIG. 21 is a plan view for explaining a modified example of the configuration of the stand-up vehicle according to the fifth embodiment.

FIG. 21 is a plan view for explaining a modified example of the configuration of the stand-up vehicle according to the fifth embodiment. A vehicle 170 according to the modified example of the fifth embodiment, is shown in FIG. 21 and is configured in the same manner as the vehicle 130 of the second embodiment, except that a microphone 172 and an inward facing camera 174 are additionally provided, and the biometric information ECU 84 additionally performs the recording processing.

As shown in FIG. 21, the microphone 172 is installed, for example, on the table 20 in order to pick up the sound of the riding space of the vehicle 170 positioned on the riding surface 132. In addition, the inward facing camera 174 is installed on each of the four support 16, for example, and faces in a direction in which an image of the riding space can be captured. The microphone 172 and the inward facing camera 174 are controlled by the biometric information ECU 84. The biometric information ECU 84 is configured to be able to record, in the storage device 84b, sound and an image of the riding space acquired by using the microphone 172 and the inward facing camera 174, respectively. Therefore, a combination of the microphone 172, the inward facing camera 174, and the storage device 84b corresponds to an example of the "recording device" according to the present disclosure.

Figure 22:
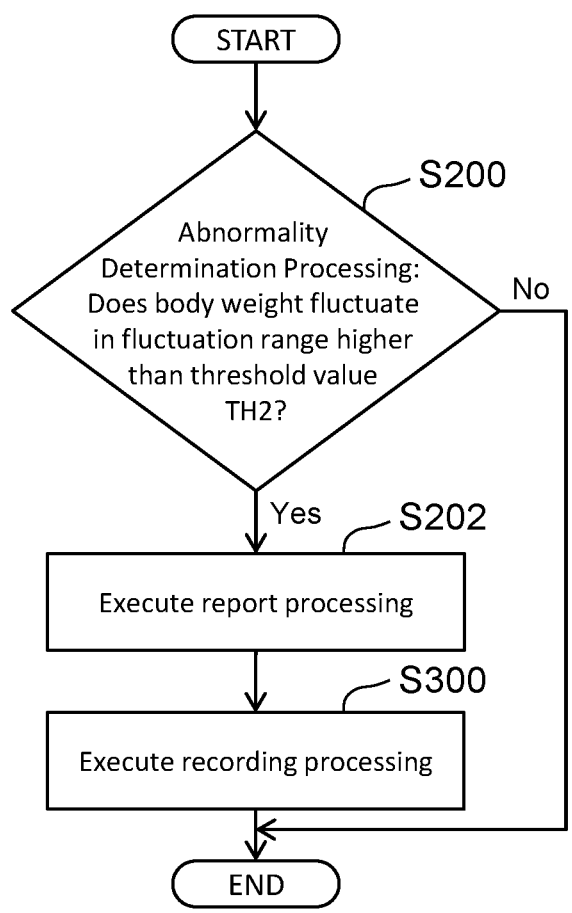
FIG. 22 is a flowchart showing another modified example of processing of the biometric information ECU according to the fifth embodiment.

FIG. 22 is a flowchart illustrating another modified example of the processing of the biometric information ECU 84 according to the fifth embodiment. The process of this flowchart is executed in the vehicle 170 shown in FIG. 21, and is the same as the process of the flowchart shown in FIG. 20 except that the "recording process" is additionally executed.

That is, in FIG. 22, in a case where it is determined in the abnormality determination process of step S200 that the body weight is fluctuating with a fluctuation width higher than the threshold TH2, the process proceeds to step S300 after the report process of step S202 is executed.

In step S300, the biometric information ECU 84 (processor 84a) executes a recording process of recording the sound and the image of the riding space acquired by using the microphone 172 and the inward facing camera 174 in the storage device 84b. The recording process is executed for a predetermined time, for example. Instead of the example illustrated in FIG. 22, only one of the sound and the image of the riding space may be stored in the recording process.

By additionally performing the above-described recording process, it is possible to provide evidence that some criminal act has been performed on the vehicle 170.

5-4. Other Examples of Recording Apparatus and Recording Process

The "recording device" according to the present disclosure may record an image of the surroundings of the stand-up vehicles by using a combination of an external sensor (for example, at least one of the camera (outward-facing camera) 56 and the LIDAR 58) provided for autonomous traveling and the storage device 84b. Further, such a storage device may be configured by combining a microphone for picking up sounds around the stand-up vehicle instead of or together with the external sensor. The "recording process" according to the present disclosure may thus operate the recording device to record at least one of the sound and the image of the surroundings of the stand-up vehicle. In addition, in the "recording process", at least one of the sound and the image may be recorded for both the riding space and the periphery of the stand-up vehicle.

In addition, the "stand-up vehicle" according to the present disclosure may be configured to execute the abnormality determination process and the report process according to the fourth embodiment in addition to the abnormality determination process and the report process according to the fifth embodiment.

What is claimed is:

1. A stand-up vehicle comprising:
   a vehicle upper portion having a riding surface configured for a user to stand on;
   a handrail arranged on the vehicle upper portion, the handrail configured for the user to grip;
   one or more biometric information sensors being at least one of a sensor installed on the handrail and a body weight sensor arranged below the riding surface and using the riding surface as a body weight detecting surface, the one or more biometric information sensors being configured to detect biometric information of the user; and
   one or more processors configured to:
      execute notification processing to notify the user of the biometric information detected by the one or more biometric information sensors;
      execute abnormality determination processing to determine whether or not there is an abnormality in the biometric information detected by the one or more biometric information sensors; and
      execute report processing to notify an outside of the stand-up vehicle of a request for rescue of the user when the abnormality determination processing determines that there is the abnormality.

2. The stand-up vehicle according to claim 1, wherein the one or more biometric information sensors include a pulse sensor installed on the handrail.

3. The stand-up vehicle according to claim 1, wherein the one or more biometric information sensors include a body temperature sensor installed on the handrail.

4. The stand-up vehicle according to claim 1, wherein in the notification processing, the one or more processors transmit the biometric information detected by the one or more biometric information sensors to a mobile terminal of the user whose biometric information is detected.

5. The stand-up vehicle according to claim 1, further comprising a display configured to display the biometric information transmitted from the one or more processors in the notification processing, wherein
   the display is disposed so as to face the user whose biometric information is detected, and has a surface structure that limits a viewing angle of the display within a predetermined range.

6. The stand-up vehicle according to claim 1, wherein the one or more biometric information sensors include a pulse sensor installed on the handrail, and the one or more processors are further configured to:

in the abnormality determination processing, determine whether or not a time increase rate of pulse detected by the pulse sensor is higher than a first threshold; and execute the report processing when the time increase rate is higher than the first threshold.

7. The stand-up vehicle according to claim 1, wherein the one or more biometric information sensors include the body weight sensor, and the one or more processors are further configured to:

in the abnormality determination processing, determine whether or not body weight detected by the body weight sensor fluctuates in a fluctuation range higher than a second threshold; and execute the report processing when the body weight detected by the body weight sensor fluctuates in the fluctuation range higher than the second threshold.

8. The stand-up vehicle according to claim 7, further comprising a recording device that records at least one of a sound and an image of at least one of a riding space located on the riding surface and a periphery of the stand-up vehicle, wherein the one or more processors are configured to execute recording processing to operate the recording device to record the at least one of the sound and the image when determining in the abnormality determination processing that the body weight detected by the body weight sensor fluctuates in the fluctuation range higher than the second threshold.

9. The stand-up vehicle according to claim 1, wherein the one or more biometric information sensors include a body composition sensor that includes a pair of electrodes installed on the handrail and detects body composition information when the pair of electrodes are in contact with both hands of the user.

* * * * *